United States Patent
Motoya et al.

(10) Patent No.: US 11,442,329 B2
(45) Date of Patent: Sep. 13, 2022

(54) OPTICAL WAVEGUIDE ELEMENT, OPTICAL MODULATOR, OPTICAL MODULATION MODULE, AND OPTICAL TRANSMISSION APPARATUS

(71) Applicant: SUMITOMO OSAKA CEMENT CO., LTD., Tokyo (JP)

(72) Inventors: Masayuki Motoya, Tokyo (JP); Toru Sugamata, Tokyo (JP)

(73) Assignee: SUMITOMO OSAKA CEMENT CO., LTD., Tokyo (JP)

( * ) Notice: Subject to any disclaimer, the term of this patent is extended or adjusted under 35 U.S.C. 154(b) by 63 days.

(21) Appl. No.: 17/105,706

(22) Filed: Nov. 27, 2020

(65) Prior Publication Data
US 2021/0165299 A1 Jun. 3, 2021

(30) Foreign Application Priority Data
Nov. 28, 2019 (JP) .............................. JP2019-215454

(51) Int. Cl.
*G02F 1/035* (2006.01)
*G02F 1/225* (2006.01)

(52) U.S. Cl.
CPC .......... *G02F 1/2255* (2013.01); *G02F 1/0356* (2013.01); *G02F 2201/127* (2013.01)

(58) Field of Classification Search
CPC .............. G02F 1/2255; G02F 1/0356; G02F 2201/127; G02F 1/0316; G02F 1/035; G02F 1/225; G02F 1/011
USPC .......................................................... 385/1–3
See application file for complete search history.

(56) References Cited

U.S. PATENT DOCUMENTS

| | | | |
|---|---|---|---|
| 6,198,855 B1 * | 3/2001 | Hallemeier ........... | G02F 1/0356 385/2 |
| 2001/0007601 A1 * | 7/2001 | Kondo .................... | G02F 1/035 385/2 |
| 2011/0002575 A1 | 1/2011 | Kato | |
| 2017/0269394 A1 * | 9/2017 | Tomioka .............. | H04N 9/3129 |
| 2018/0039104 A1 * | 2/2018 | Hosokawa ............. | G02F 1/225 |

FOREIGN PATENT DOCUMENTS

| | | |
|---|---|---|
| CN | 110286525 A | 9/2019 |
| JP | 2009-181108 | 8/2009 |

\* cited by examiner

*Primary Examiner* — Robert Tavlykaev
(74) *Attorney, Agent, or Firm* — Rankin, Hill & Clark LLP

(57) ABSTRACT

An optical waveguide element including a substrate, an optical waveguide formed on the substrate, and an electrode for controlling a light wave propagating through the optical waveguide, in which the optical waveguide and the electrode have an intersection in which the optical waveguide and the electrode intersect with each other, and at the intersection, the electrode has a multilayer structure including a plurality of metal layers made of a metal material, and a resin layer made of a resin material is formed between the electrode and the substrate.

12 Claims, 14 Drawing Sheets

PART A DETAILS

IV-IV CROSS SECTION

FIG. 5
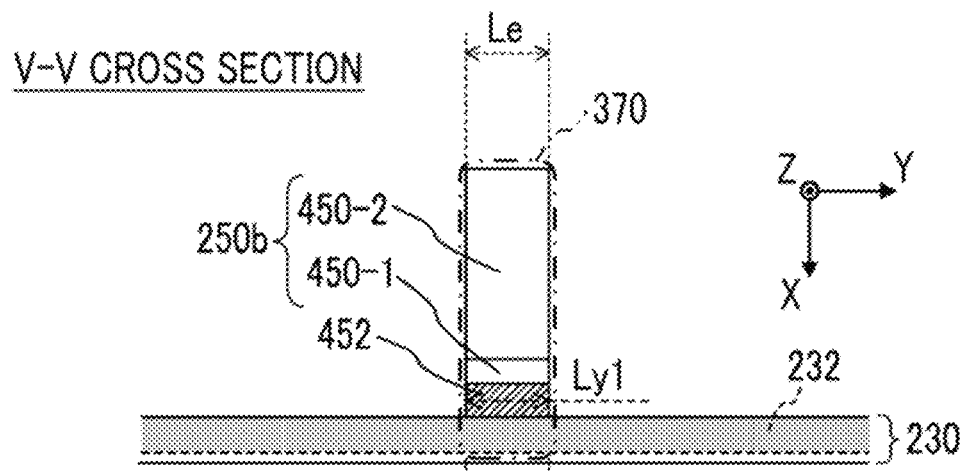
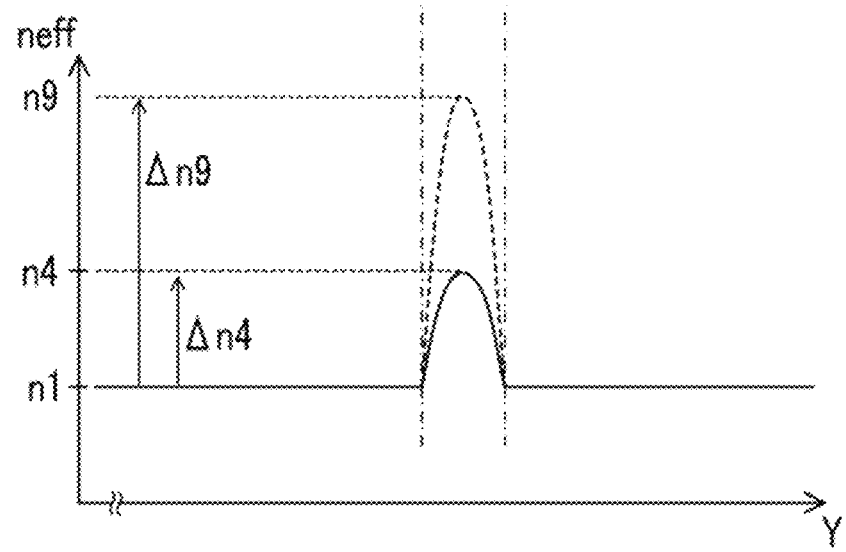

PART B DETAILS

RELATED ART

XVIII-XVIII CROSS SECTION

FIG. 19
RELATED ART
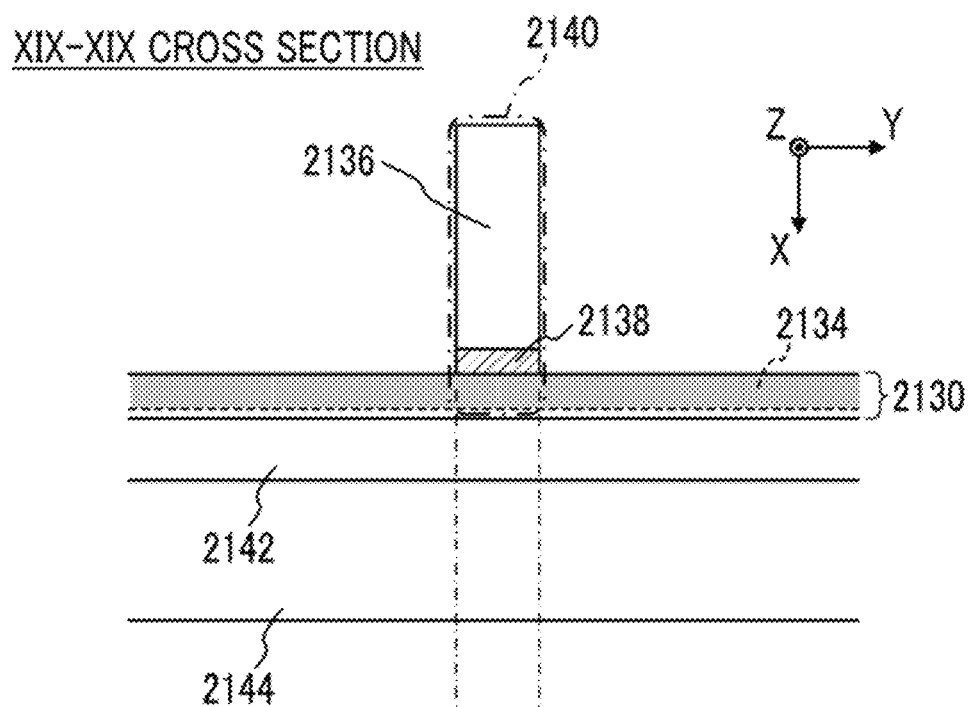
XIX-XIX CROSS SECTION
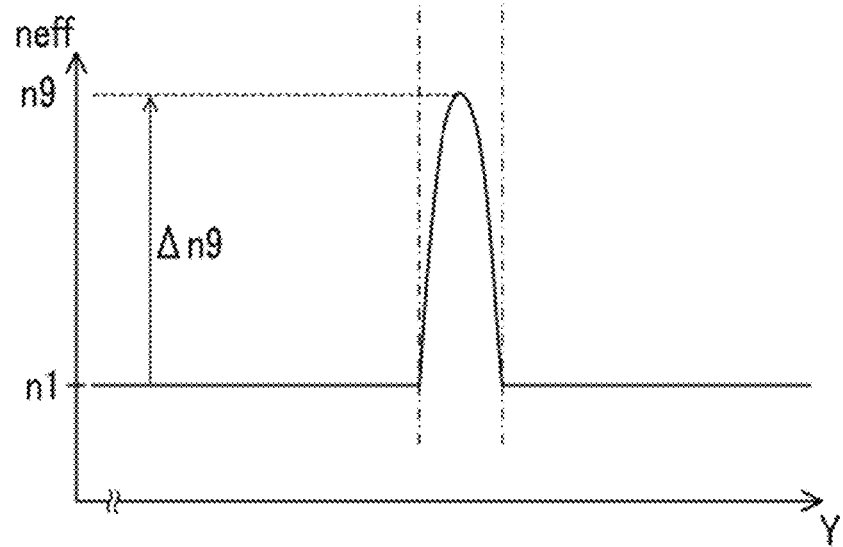

OPTICAL WAVEGUIDE ELEMENT, OPTICAL MODULATOR, OPTICAL MODULATION MODULE, AND OPTICAL TRANSMISSION APPARATUS

CROSS-REFERENCE TO RELATED APPLICATIONS

This application claims the benefit of Japanese Patent Application No. 2019-215454 filed Nov. 26, 2019, the disclosure of which is herein incorporated by reference in its entirety.

BACKGROUND OF THE INVENTION

Field of the Invention

The present invention relates to an optical waveguide element, an optical modulator, an optical modulation module, and an optical transmission apparatus.

Description of Related Art

In a high-speed/large-capacity optical fiber communication system, an optical modulator incorporating an optical modulation element, which is an optical waveguide element composed of an optical waveguide formed on a substrate, is often used. Among these, optical modulation elements in which $LiNbO_3$ (hereinafter, also refereed to as LN) having an electro-optic effect is used for substrates has a small optical loss and can realize a wide band optical modulation characteristic, so the optical modulation elements ire widely used for high-speed/large-capacity optical fiber communication systems. In such an optical modulation element using the LN substrate, for example, a Mach-Zehnder type optical waveguide and a signal electrode for applying a high-frequency electrical signal as a modulation signal to the optical waveguide are provided.

In particular, due to the increasing transmission capacity in recent years, the main stream of modulation methods in optical fiber communication systems is multi-level modulation end the transmission format adopting polarized wave multiplexing for multi-level modulation, such as Quadrature Phase Shift Keying (QPSK) and Dual Polarization-Quadrature Phase Shift Keying (DP-QPSK), which are used in fundamental optical transmission networks and is also being introduced into a metro networks.

An optical modulator that performs QPSK modulation (QPSK optical modulator) and an optical modulator that performs DP-QPSK modulation (DP-QPSK optical modulator) each include a plurality of Mach-Zehnder optical waveguides in a nest structure called so-called nested type, each of which includes at least one signal electrode. Further, in an optical modulator using such a Mach-Zehnder optical waveguide, bias electrodes for compensating for fluctuations in the bias points due to so-called DC drift are also generally formed.

These signal electrodes and bias electrodes (hereinafter, also collectively referred to as simply electrodes) are formed so as to extend to the vicinity of the outer periphery of the LN substrate for connection with an electric circuit outside the substrate. Therefore, the plurality of optical waveguides and the plurality of electrodes intersect in a complicated manner on the substrate, and a plurality of intersections of the optical waveguide and the electrodes are formed.

When the optical waveguides and the electrodes are formed so as to be in direct contact with each other at the intersections, the light propagating through the optical waveguides is absorbed by the metal constituting the electrodes at these intersections, resulting in an optical loss (optical absorption loss). This optical loss can, for example, create an optical loss difference between the two parallel waveguides constituting the Mach-Zehnder type optical waveguide and degrade the extinction ratio of the modulated light. Since the required conditions for the extinction ratio are more severe as the modulation speed required for the optical modulator is higher, the deterioration of the extinction ratio is expected to become more apparent as the modulation speed increases with the increase of the transmission capacity.

Further, the intersections as described above can be widely and generally formed not only in an optical modulator using a Mach-Zehnder type optical waveguide, but also in an optical modulator using an optical waveguide that constitutes a directional coupler or a Y branch, and or an optical waveguide element such as an optical switch. Then, the number of intersections on the substrate increases more and more when the optical waveguide pattern and the electrode pattern become complicated due to further miniaturization, multi-channelization, or high integration of the optical waveguide element, which may cause a non-negligible loss factor and limit the performance of the optical waveguide element.

As a technique for reducing the optical absorption loss due to the electrode metal formed on the optical waveguide, in the related art, a technique has been known in which a buffer layer made of SIO2 is provided on the surface of the substrate on which the optical waveguide is formed, and the electrode metal is formed above the buffer layer (for example, Japanese Laid-open Patent Publication No. 2009-181108).

However, since $SiO_2$ has higher rigidity than the LN substrate, when a $SiO_2$ film is formed on the LN substrate, not only stress is applied from the $S1O_2$ film itself to the substrate, but also stress is applied from the electrode metal formed on the upper part of the $SiO_2$ film to the substrate via the $SiO_2$ film. Then, such stress may adversely affect the optical characteristics and electrical characteristics of the optical waveguide element due to the photoelastic effect of the LN substrate.

In particular, in an optical waveguide element in which the LN substrate is formed thin (for example, with a thickness of several tens of μm) in order to further strengthen the interaction between the signal electric field end the waveguide light in the substrate (that is, to increase the electric field efficiency), the stress applied to the substrate from the $SiO_2$ film and the electrode metal above the $SiO_2$ film can have a non-negligible influence on the optical characteristics and/or electrical characteristics, and can be a factor that, induces mechanical damage such as cracks and breaks on the LN substrate due to the difference in linear expansion coefficient between the $SiO_2$ film and the LN substrate.

SUMMARY OF THE INVENTION

From the above background, in the optical waveguide element, it is required to effectively reduce an optical absorption loss of waveguide light due to an electrode metal, which may occur at the intersection of an optical waveguide and an electrode, without causing degradation or deterioration of the optical characteristics of the optical waveguide element.

One aspect of the present invention is an optical waveguide element including a substrate, an optical waveguide formed on the substrate, and an electrode for controlling a light wave propagating through the optical waveguide, in which the optical waveguide and the electrode have an intersection in which the optical waveguide and the electrode intersect with each other, and at the intersection, the electrode has a multilayer structure including a plurality of metal layers made of a metal material, and a resin layer made of a resin material is formed between the electrode and the substrate.

According to another aspect of the present invention, in the multilayer structure of the electrode, at least one of the metal layers excluding the lowest layer, which is the metal layer closest to the substrate, may be thicker than the lowest layer.

According to another aspect of the present, invention, the resin layer is formed such that a length of the resin layer along a waveguide direction of the optical waveguide may be longer than a length of the metal layer which is adjacent along the waveguide direction of the optical waveguide.

According to another aspect of the present invention, the resin layer is formed such that a length of a part of the resin layer where the adjacent metal layer is not formed, along the waveguide direction of the optical waveguide may be longer than a wavelength of light propagating through the optical waveguide.

According to another aspect of the present invention, the metal layer adjacent to the resin layer is formed such that a length of a metal layer a lone; the waveguide direction of the optical waveguide may be equal to or longer than a length of another metal layer adjacent to the metal layer along the waveguide direction of the optical waveguide.

According to another aspect of the present invention, the metal layer adjacent to the resin layer is formed such that a length of a part of the metal layer where the other metal layer is not formed along the waveguide direction of the optical waveguide may be longer than a wavelength of light propagating through the optical waveguide.

According to another aspect of the present invention, the resin layer is formed such that at respective ends along the waveguide direction of the optical waveguide, a width in a direction orthogonal to the waveguide direction may be equal to or less than a width of the optical waveguide and is narrower as a distance from the intersection increases.

According to another aspect of the present invention, the resin layer may be formed such that a thickness is thinner at respective ends along the waveguide direction of the optical waveguide as a distance from the intersection increases.

According to another aspect of the present invention, a slit may be formed in at least one metal layer excluding the metal layer formed at the uppermost part, among the metal layers constituting the multilayer structure.

According to another aspect of the present invention, the resin layer may be formed across at least two intersections.

Another aspect of the present invention is an optical modulator including any of the above optical waveguide elements, which are optical modulation elements that modulate light, a housing that houses the optical waveguide element, an optical fiber that inputs light to the optical waveguide element, and a second optical fiber that guides the light output by the optical waveguide element to the outside of the housing.

Another aspect of the present invention is an optical modulation module including any of the above optical waveguide elements, which are optical modulation elements that modulate light, and a drive circuit that drives the optical waveguide element.

Yet another aspect of the present invention is an optical transmission apparatus including the optical modulator or the optical modulation module, and an electronic circuit that generates an electrical signal for causing the optical waveguide element to perform a modulation operation.

According to the present invention, in the optical waveguide element, it is possible to effectively reduce an optical absorption loss of waveguide light due to an electrode metal, which may occur at the intersection of an optical waveguide and an electrode on a substrate, without causing degradation or deterioration of the optical characteristics of the optical waveguide element.

BRIEF DESCRIPTION OF THE DRAWINGS

FIG. 5 is a cross-sectional view taken along line V-V of part A illustrated in FIG. 3 and a diagram for explaining an action in the cross section.

FIG. 19 is a cross-sectional view taken along line XIX-XIX of the intersection illustrated in FIG. 17.

DETAILED DESCRIPTION OF THE INVENTION

As a measure to reduce the stress applied to the substrate from the SiO2 film as in the above-described related art, a configuration is conceivable in which the SiO2 film is not provided on the entire surface of the substrate, but the SiO2 film is formed only on a part of the substrate, where the optical waveguide and the electrode intersect each other, and an electrode is formed on the upper part of the SiO2 film.

Figure 17:
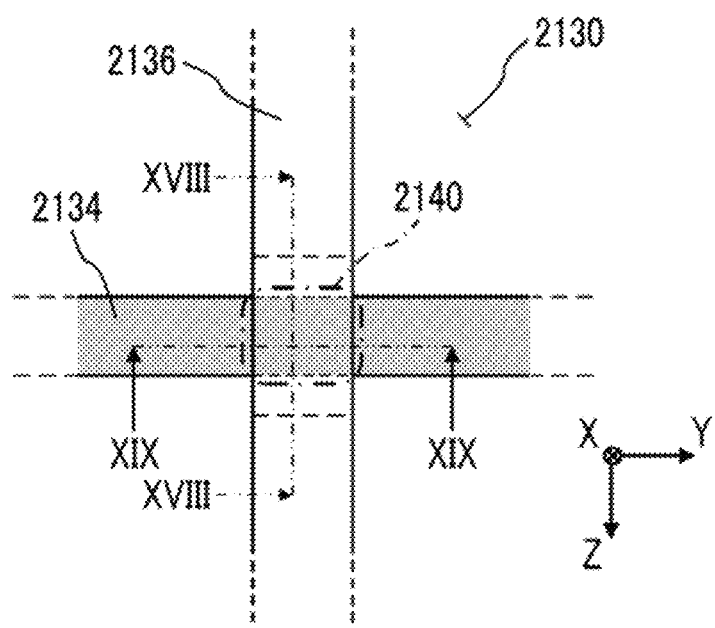
FIG. 17 is a plan view illustrating an example of a configuration of an intersection between an optical waveguide and an electrode in an optical waveguide element in the related art.
Figure 18:
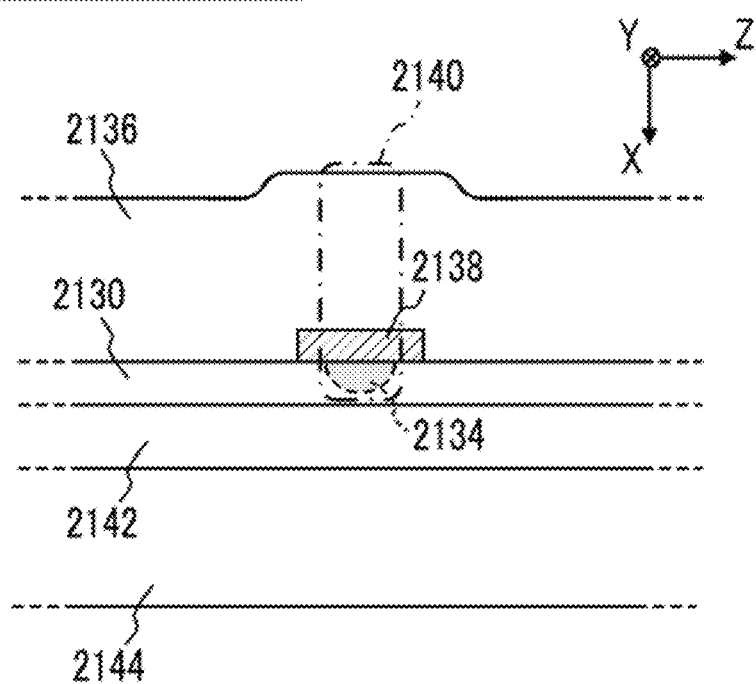
FIG. 18 is a cross-sectional view taken along line XVIII-XVIII of the intersection illustrated in FIG. 17.

FIG. 17 is a plan view of the substrate surface at an intersecting part in such an optical waveguide element in the related art in which an SiO2 film is formed only at the intersecting part on the substrate. Further, FIG. 18 is a cross-sectional view taken along line XVIII-XVIII of the intersection illustrated in FIG. 17, and the upper diagram (diagram at the top) of FIG. 19 is a cross-sectional view taken along line XIX-XIX of the intersection illustrated in FIG. 17. Further, the lower diagram (diagram at the bottom) of FIG. 19 is a diagram illustrating a change in the effective refractive index of the optical waveguide along the waveguide direction of the optical waveguide in the XIX-XIX cross-sectional view.

As illustrated in FIG. 18, the substrate 2130 is, for example, an LK substrate thinned to a thickness of 10 μm, and is fixed on the support substrate 2144 via an adhesive layer 2142. The support substrate 2144 is, for example, a glass substrate, an LN substrate, a Si substrate, or the like.

As illustrated in FIG. 17, on the substrate 2130, for example, an optical waveguide 2134, formed by Ti thermal diffusion, extending in the Y direction, and an electrode 2136 made of, for example, gold (Au), extending in the Z direction, are formed. At the intersection 2140 of the optical waveguide 2134 and the electrode 2136 (the part surrounded by the rectangle of the dot-dashed line in FIG. 17), as illustrated in FIG. 18 and the upper diagram of FIG. 19, an SiO2 film 2138, which is a buffer layer, is formed on the upper part of the optical waveguide 2134, and the electrode 2136 is formed on the upper part of the SIO2 film 2138.

The presence of the SiO2 film 2138 suppresses the optical absorption loss of the waveguide light of the optical waveguide 2134 due to the metal Au of the electrode 2136, at the intersection 2140.

However, in such a configuration, the SiO2 film 2138 is formed only in a part of the optical waveguide 2134, that is, a part corresponding to the intersection 2140, and as a result, the stress from the SiO2 film 2138 and the electrode 2136 is intensively applied to the part corresponding to the intersection 2140 of the optical waveguide 2134.

In particular, in an optical modulation element that performs high-speed optical modulation exceeding 100 G, the signal electrode is generally configured to have a thickness of 20 μm to 40 μm in order to reduce the conductor loss, or the like, while the SiO2 film as a buffer layer provided for reducing the above-described optical absorption loss is formed with a thickness of 0.3 μm to 0.5 μm, which is a sufficient thickness for the purpose. Therefore, particularly in a configuration in which the electrode 2136 is a signal electrode, the stress stored in the metal Au at the time of forming the electrode 2136 or the stress remaining at the interface between the electrode 2136 and the SiO2 film 2138 is applied to the optical waveguide 2134 via the SiO2 film 2138 formed with a thickness of 1 μm or less.

Then, as illustrated in the lower diagram of FIG. 19, due to the photoelastic effect of the LN constituting the substrate 2130, these stresses increase the effective refractive index n1 in the optical waveguide 2134 only by Δn9, for example, at the intersection 2140, and change sharply the effective refractive index n1 to n9. In the lower diagram of FIG. 19, the vertical axis indicates the effective refractive index neff of the optical waveguide 2134, and the horizontal axis indicates the position of the optical waveguide 2134 in the Y direction, which is the waveguide direction.

Such a steep change in the effective refractive index causes a steep change in the propagation mode of light in the optical waveguide 2134 at the intersection 2140 (for example, a steep change in the mode field diameter of the propagation mode), resulting in leakage light due to the change in the mode at the boundary of the intersection 2140. As a result, in the optical waveguide element in the related art as described above, an increase in the optical waveguide loss and a deterioration in the extinction ratio may occur due to the leakage light.

In particular, in an optical waveguide element using a substrate which is thinned to increase electric field efficiency, stress sensitivity is higher than an optical waveguide element using a thicker substrate, and an increase in loss and a deterioration of the extinction ratio due to leakage light caused by a mode change as described above may occur more strongly. Further, when the intersection 2140 of the optical waveguide 2134 and the electrode 2136 is in the vicinity of the optical waveguide part forming a Y-shaped light branching section or an optical Y-branch coupler, the change in mode causes a bias in the light branching ratio and photosynthetic action, and have a particularly large effect on the extinction ratio.

The change in the effective refractive index of the optical waveguide 2134 at the intersection 2140 may decrease or increase, depending on the direction of the stress applied to the intersection 2140 (the direction of the substrate relative to the crystal axis), with respect to the effective refractive index n1 of the other part of the optical waveguide 2134. That is, the sign of Δn9 may be positive (that is, an increase in refractive index) as in the example in the lower diagram of FIG. 19, or negative (that is, a decrease in refractive index). Even when the effective refractive index decreases sharply at the intersection 2140, leakage light may occur due to the change in the propagation mode in the optical waveguide 2134, resulting in an increase in optical waveguide loss and deterioration of the extinction ratio.

The optical waveguide element according to the present invention is able to effectively reduce an optical absorption loss of waveguide light due to an electrode metal at an intersection, without causing degradation or deterioration of the optical characteristics of the optical waveguide element that may occur due to such a change in the propagation mode at the intersection.

Hereinafter, embodiments of the present invention will be described with reference to the drawings.

First Embodiment

Figure 1:
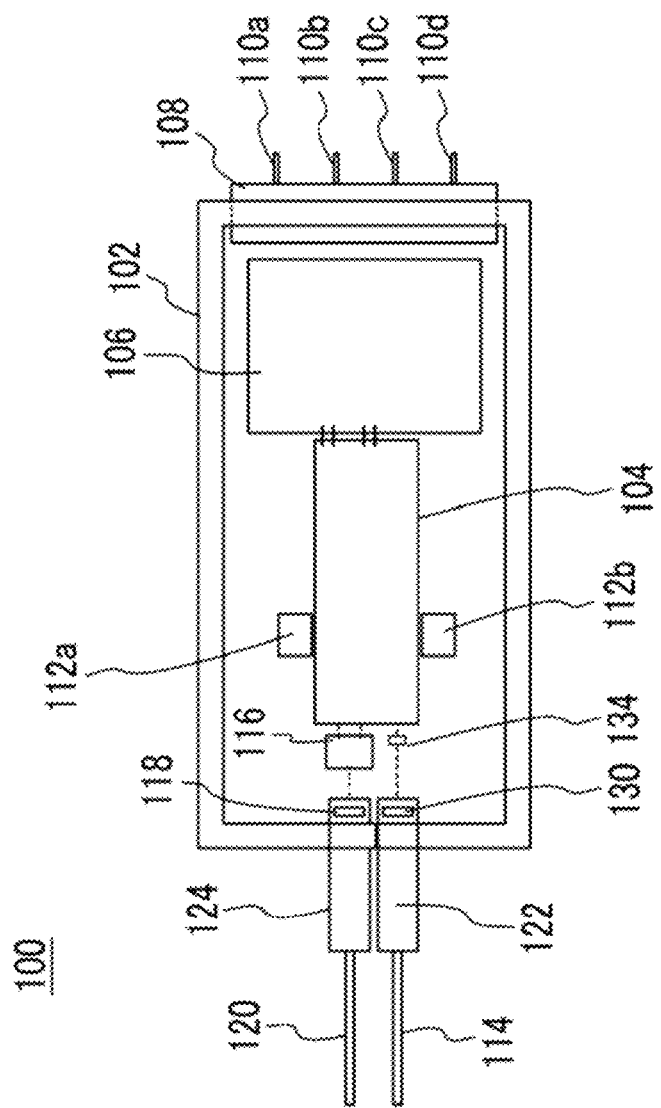
FIG. 1 is a diagram illustrating a configuration of an optical modulator according to a first embodiment of the present invention.

FIG. 1 is a diagram illustrating a configuration of an optical modulator 100 using an optical modulation element 104, which is an optical waveguide element according to the first embodiment of the present invention. The optical modulator 100 includes a housing 102, an optical modulation element 104 housed in the housing 102, and a relay substrate 106. The optical modulation element 104 is, for example, a DP-QPSK modulator. Finally, a cover (not illustrated), which is a plate body, is fixed to the opening of the housing 102, and the inside of the housing 102 is airtightly sealed.

The optical modulator 100 also includes signal pins 110a, 110b, 110c, and 110d for inputting a high-frequency electrical signal used for modulation of the optical modulation element 104, and a feedthrough section 108 for introduction these signal pins 110a, 110b, 110c, and 110d into the housing 102.

Further, the optical modulator 100 includes an input optical fiber 114 for inputting light into the housing 102 and an output optical fiber 120 for guiding the light modulated by the optical modulation element 104 to the outside of the housing 102 on the same surface of the housing 102.

Here, the input optical fiber 114 and the output optical fiber 120 are fixed to the housing 102 via the supports 122 and 124, which are fixing members, respectively. The light input from the input optical fiber 114 is collimated by the lens 130 disposed in the support 122, end then input to the optical modulation element 104 via the lens 134. However, this is only an example, and the light input to the optical modulation element 104 may be performed by introducing, for example, the input optical fiber 114 according to the related art into the housing 102 via the support 122, and connecting the end face of the introduced input optical fiber 114 to the end face of the substrate 230 of the optical modulation element 104.

The optical modulator 100 also has an optical unit 116 that polarizes and synthesizes two beams of modulated light output from the optical, modulation element 104. The light after polarization synthesis, output from the optical unit 116, is collected by the lens 118 disposed in the support 124 and coupled to the output optical fiber 320.

The relay substrate 106 relays high-frequency electrical signals input from signal pins 110a, 110b, 110c, and 110d to the optical modulation element 104 by a conductor pattern (not illustrated) formed on the relay substrate 106. The conductor pattern on the relay substrate 106 is connected to a pad (described later) constituting one end of the signal electrode of the optical modulation element 104 by wire bonding or the like, for example. Further, the optical modulator 100 includes two terminators 112a and 112b having predetermined impedances in the housing 102.

Figure 2:
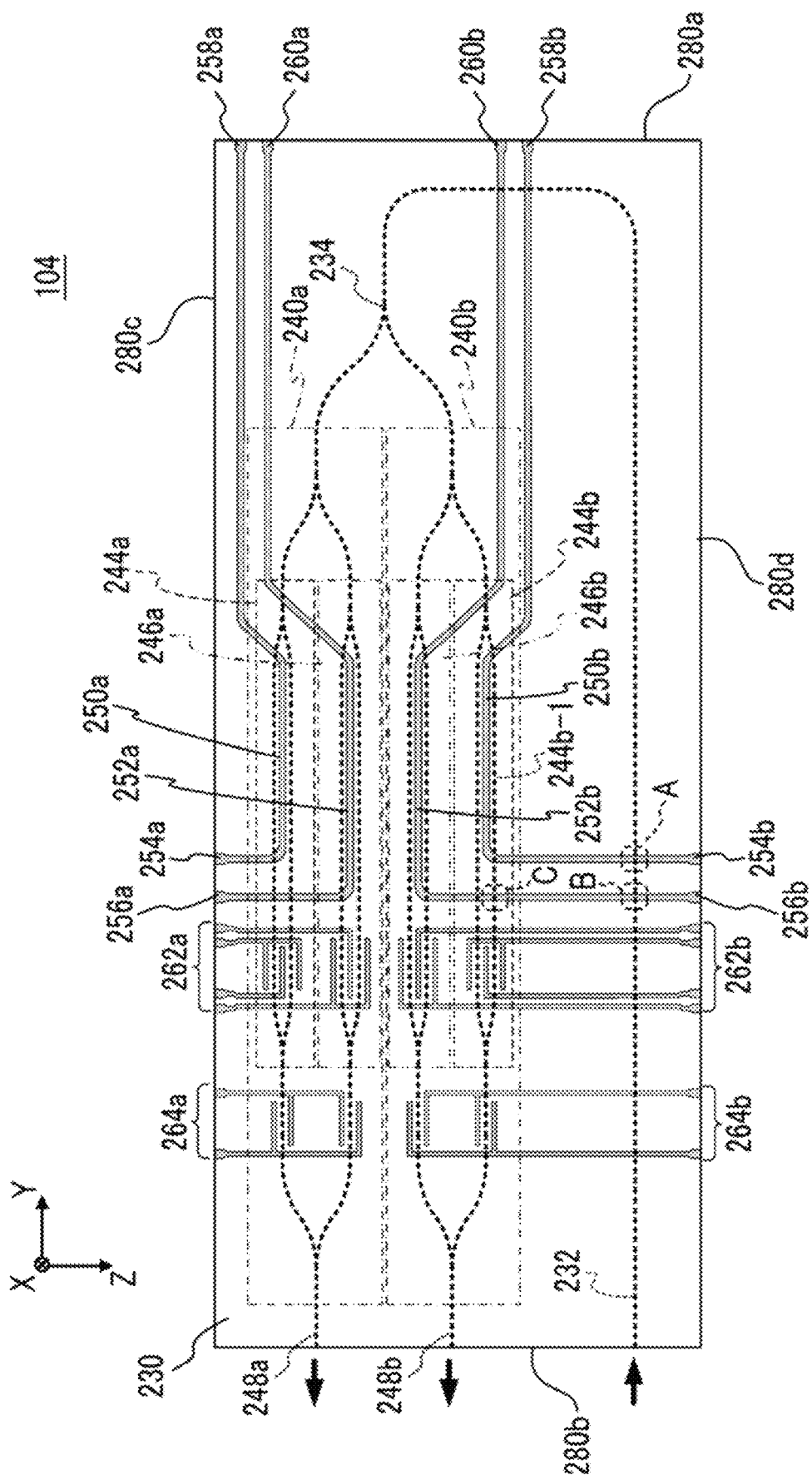
FIG. 2 is a diagram illustrating a configuration of an optical modulation element used in the optical modulator illustrated in FIG. 1.

FIG. 2 is a diagram illustrating an example of the configuration of the optical modulation element 104, which is an optical waveguide element housed in the housing 102 of the optical modulator 100 illustrated in FIG. 1. The optical modulation element 104 is composed of an optical waveguide (bold dotted line) formed on a substrate 230 made of, for example, LN, and performs, for example, 200 G of DP-QPSK modulation. These optical waveguides can be formed by thermally diffusing Ti on the surface of the substrate 230.

The substrate 230 is, for example, rectangular and has two left and right sides 280a and 280b, which extend in the up-down direction and face each other, and upper and lower sides 280c and 230d, which extend in the left-right direction and face each other. In FIG. 2, as illustrated by the coordinate axes illustrated in the upper left part, the normal direction toward the back of the paper surface of FIG. 2 (from the front surface to the back surface) is the X direction, the right direction is the Y direction, and the lower direction is the Z direction.

The optical modulation element 104 includes an input waveguide 232 that receives the input light (arrow pointing to the right) from the input optical fiber 114 on the lower side of the left, side 280b of the substrate 230, and a branched waveguide 234 that branches the input light into two light beams having the same light amount. Further, the optical modulation element 104 includes a so-called nested Mach-Zehnder type optical waveguides 240a and 240b (each is apart surrounded by a dot-dashed line), which are two modulation units for modulating each light branched by the branched waveguide 234.

The nested Mach-Zehnder type optical waveguides 240a and 240b include two Mach-Zehnder type optical waveguides 244a (inside the dashed line) and 246a (inside the two-dot chain line), and 244b (inside the dashed line) and 246b (inside the two-dot chain line), respectively, provided in the two waveguide parts forming a pair of parallel waveguides. Thus, the nested Mach-Zehnder type optical waveguides 240a and 240b QPSK-modulate each of the Input light branched into two beams by the optical branched waveguide 23, and then output the modulated light (output) from the respective output waveguides 248a and 248b to the left.

These two output light beams are then polarized and synthesized by an optical unit 116 disposed outside the substrate 230 and are combined into one light beam. Hereinafter, the input waveguide 232, the branched waveguide 234, and the nested Mach-Zehnder type optical waveguides 240a and 240b which are formed on the substrate 230 of the optical modulation element 104 and the Mach-Zehnder type optical waveguides 244a, 246a, 244b, and 246b included in the nested Mach-Zehnder type optical waveguides 240a and 240b are collectively referred to as an optical waveguide 232 or the like.

On the substrate 230, signal electrodes 250a, 252a, 250b, and 252b for respectively causing total four Mach-Zehnder type optical waveguides 244a, 246a, 244b, and 246b constituting the nested Mach-Zehnder type optical waveguides 240a and 240b to perform modulation operations are provided. The signal electrodes 250a and 252a are bent to the left, extend to the upper side 280c of the substrate 230, and are connected to the pads 254a and 256a. The right sides of the signal electrodes 250a and 252a extend to the right side 260a of the substrate 230 and is connected to the pads 258a and 260a.

Similarly, the left sides of the signal electrodes 250b and 252b extend to the lower side 280d of the substrate 230 and are connected to the pads 254b and 256b, and the right sides of the signal electrodes 250b and 252b extend to the right side 280a of the substrate and are connected to the pads 258b and 260b. The pads 258a, 260a, 258b, and 260b are connected to the relay substrate 106 described above by wire bonding or the like.

The signal electrodes 250a, 252b, 250b, and 252b form, for example, a coplanar transmission line having a predetermined impedance together with a ground conductor pattern (not illustrated) formed on the substrate 230, according to the related art. The ground conductor pattern is provided so as not to be formed on the optical waveguide 232 or the like, and the plurality of regions formed by dividing the ground conductor pattern by the optical waveguide 232 or the like can be connected to each other by wire bonding or the like.

The pads 254a, 256a and the pads 254b, 256b are respectively connected to the terminators 112a and 112b described above. Thus, the high-frequency electrical signals input from the relay substrate 106 connected to the pads 258a, 260a, 258b, and 260b become traveling waves to propagate through the signal electrodes 250a, 252a, 250b, and 252b, and modulate the light waves propagating through the Mach-Zehnder type optical waveguides 244a, 246a, 244b, and 246b, respectively.

Here, the substrate 230 is formed in a thickness of 20 μm or less, preferably 10 μm or less, such that the interaction between the electric field formed in the substrate 230 by the signal electrodes 250a, 252a, 250b, and 252b and the waveguide light propagating through the Mach-Zehnder type optical waveguides 244a, 246a, 244b, and 246b is further strengthened to performs high-speed modulation operation at a lower voltage. In addition, the back surface of the substrate 230 (the surface facing the surface illustrated in FIG. 2) is adhered to a support substrate such as glass via an adhesive layer (not illustrated in FIG. 2, described as an adhesive layer 490 and a support substrate 492 in FIG. 4 and the like to be described later).

The optical modulation element 104 is also provided with bias electrodes 262a, 264a, and 262b, 264b for compensating for fluctuations in the bias point due to so-called DC drift. The bias electrodes 262a and 262b are each composed of two pairs of electrodes, and are used to compensate for fluctuations in the bias points of the Mach-Zehnder type optical waveguides 244a, 246a and 244b, 246b, respectively. Further, the bias electrodes 264a and 264b are used to compensate for fluctuations in the bias points of the nested Mach-Zehnder type optical waveguides 240a and 240b, respectively.

These bias electrodes 262a, 264a, and 262b, 264b also extend to the sides 280c and 280d of the substrate 230, respectively, and are connected to a bias control circuit outside the housing via lead pins (not illustrated) provided in the vicinity of the sides 280c and 280d, for example, on the bottom surface of the housing 102. Thus, the bias electrodes 262a, 264a, 262b, and 264b are driven by the bias control circuit to compensate for fluctuations in the bias points of the corresponding Mach-Zehnder type optical waveguides. Hereinafter, the signal electrodes 250a, 252a, 250b, 252b and the bias electrodes 262a, 264a, 262b, 264b are collectively referred to as electrodes 250a and the like.

The optical modulation element 104 configured as described above includes many intersects where the optical waveguide 232 and the like intersect with the electrodes 250a and the like. As can be easily understood from the description in FIG. 2, in FIG. 2, all the parts where the bold dotted lines illustrating the optical waveguide 232 and the like and the belt-like parts illustrating the electrode 250a and the like intersect with each other are intersecting parts where the optical waveguide 232 and the like and the electrode 250a and the like intersect each other. In the present embodiment, the optical modulation element 104 includes a total of 50 intersecting parts.

Figure 3:
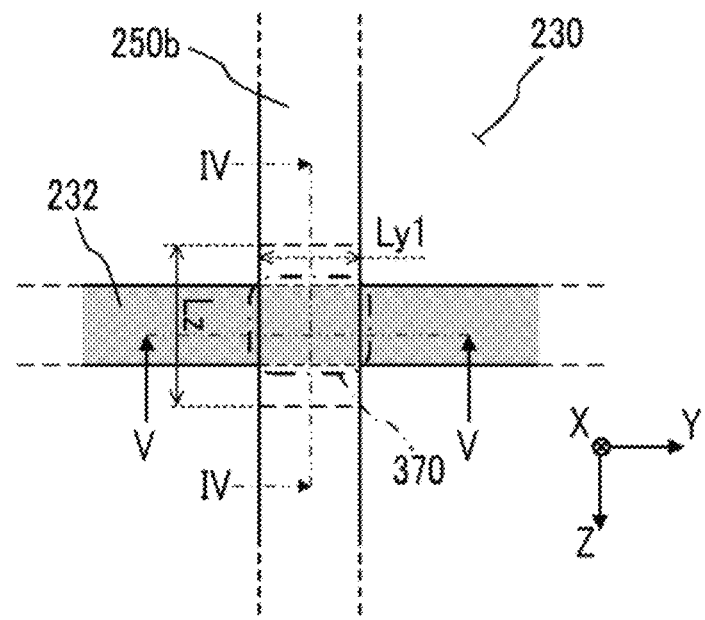
FIG. 3 is a partial detailed view of part A of the optical modulation element illustrated in FIG. 2.
Figure 4:
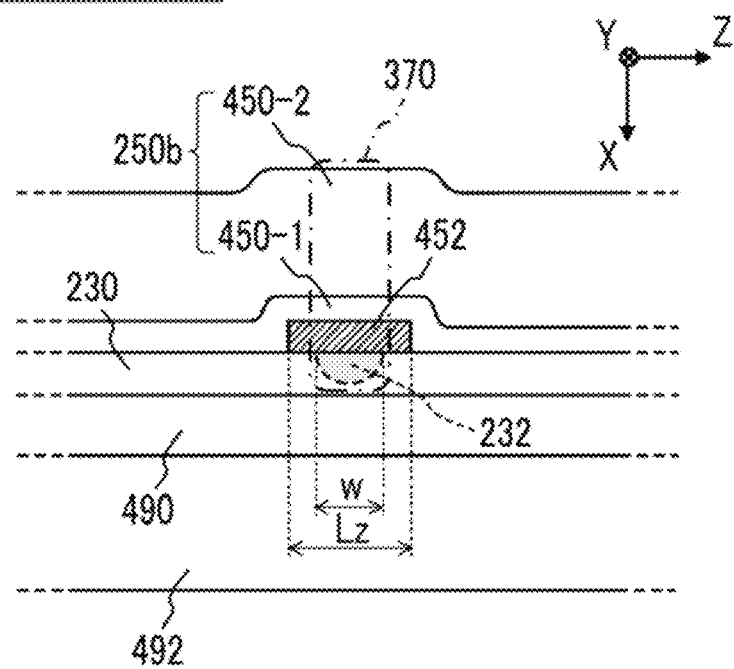
FIG. 4 is a cross-sectional view taken along line IV-IV of part A illustrated in FIG. 3.

FIGS. 3, 4, and 5 are partial detailed views illustrating the configuration of part A in FIG. 2 where the input waveguide 232 and the signal electrode 250b intersect, as a first, example of the configuration of such an intersecting part. Here, FIG. 3 is a plan view of part A, and FIG. 4 is a cross-sectional view taken along line IV-IV of part A illustrated in FIG. 3. The upper diagram of FIG. 5 is a cross-sectional view taken along line V-V of part A illustrated in FIG. 3, and the lower diagram of FIG. 5 is a diagram which is drawn corresponding to the upper diagram of FIG. 5 and illustrates the change of the effective refractive index inside the input waveguide 232 along the waveguide direction of the input waveguide 232. FIGS. 3, 4, and 5 are diagrams corresponding to FIGS. 17, 18, and 19 depicting intersecting parts in the related art.

The configurations illustrated in FIGS. 3, 4, and 5 are examples of the configuration of the parts where the optical waveguide 232 and the like and the electrode 250a and the like intersect each other in the optical modulation element 104, and these can be similarly used for any part where the optical waveguide 232 and the like and the electrode 250a and the like intersect each other, other than the part A.

In FIG. 3, the input waveguide 232 extending in the left-right direction (Y direction) and the signal electrode 250b extending in the up-down direction (Z direction) intersect with each other to form an intersection 370 (a part surrounded by the rectangle of a dot-dashed line). In FIG. 4, the substrate 230 is fixed to the support substrate 492 via the adhesive layer 490. Here, the adhesive layer 490 is made of, for example, a thermosetting resin, and the support substrate 492 is made of, for example, a glass substrate, an LN substrate, a Si substrate, or the like.

Then, at the intersection 370, the signal electrode 250b has a multilayer structure including a plurality of metal layers 450-1 and 450-2 made of a metal material, and a resin layer 452 made of a resin material is formed between the signal electrode 250b and the substrate 230. The number of metal layers forming the multilayer structure is not limited to two, and may be three or more. Further, the number of resin layers may be at least one, or may be two or more.

Further, the plurality of metal layers 450-1 and 450-2 may be made of different types of metals, or may be made of the same type of metal and the manufacturing methods of the metal layers may be different from each other (the same applies when three or more metal layers are induced). For example, when the metal layers 450-1 and 450-2 are made of different types of metals, the metal layer 450-1 may be made of titanium (Ti) and the metal layer 450-2 may be made of gold (Au). When the metal layers 450-1. and 450-2 are made of the same type of metal and the manufacturing methods of the metal layers are different from each other, the metal layer 450-1 may be made of gold (Au) formed by sputtering and the metal layer 450-2 may be made of gold (Au) formed by electroplating. From the viewpoint that the interface between the metal layers 450-1 and 450-2 disperses stress, it is desirable that the two metal layers forming the boundary line, such as the metal layers 450-1 and 453-2, are made of different types of metals.

The signal electrode 250b including the metal layers 450-1 and 450-2 are generally formed to have an overall thickness in the range of 20 μm to 40 μm, in the optical modulation element 104 that operates in a wide band with a modulation speed exceeding 100 Gbps. Further, in general, the metal layer 450-1 is formed to have a thickness of about 0.1 to 0.3 μm as a foundation layer for forming the metal layer 450-2. That is, the thickness of the signal electrode 250b is almost determined by the thickness of the metal layer 450-2. Therefore, the main cause of the stress applied from the signal electrode 250b to the substrate 230 is the upper metal layer 450-2. The bias electrodes 262a, 262b, 264a, and 264b are generally formed to have an overall thickness in the range of 1 μm to 5 μm, and even in this case, the metal foundation layer constituting these bias electrodes is generally formed to have a thickness of about 0.1 to 0.3 μm. Therefore, even in the case of the bias electrode, the upper metal layer is the main cause of stress on the substrate 230.

As illustrated in the upper diagram of FIG. 5, in the present embodiment, the metal layers 450-1 and 450-2 of the signal electrode 250b are formed with the same width Le, and the width Ly1 of the resin layer 452 is the same as the width Le of these metal layers. However, this is only an example, and the width Ly1 of the resin layer 452 can be any width larger than the width of the metal layer 450-1 such that the metal layer 450-1 above the resin layer 452 does not come into contact with the input waveguide 232. Further, the width of the upper metal layer 450-2 may be formed smaller than the width of the lower metal layer 450-1, or may be formed larger.

The lower diagram of FIG. 5 is a diagram illustrating a change in the effective refractive index of the input waveguide 232 along the waveguide direction (Y direction) of the input waveguide 232 in the configuration illustrated in the upper diagram of FIG. 5. Similar to the lower diagram of FIG. 19, the vertical axis in the lower diagram of FIG. 5 indicates the effective refractive index neff of the input waveguide 232, and the horizontal axis indicates the position of the input waveguide 232 in the Y direction, which is the waveguide direction.

As illustrated in the upper diagram of FIG. 5, since the resin layer 452 is formed between the metal layer 450-1 and the substrate 230 at the intersection 370, it is possible to prevent optical absorption loss due to the metal layer 450-1 from occurring in the waveguide light propagating through the input waveguide 232 at the intersection 370. Farther, since the signal electrode 250a at the intersection 370 is composed of a multilayer structure including a plurality of metal layers 450-1 and 450-2, and the resin layer 452 is provided between the signal electrode 250a and the substrate 230, the stress transmitted from the upper metal layer 450-2 to the input waveguide 232 at the intersection 370 is relaxed by the interface between the metal layer 450-2 and the lower metal layer 450-1 and/or the lower metal layer 450-1, and is further relaxed by the low rigidity resin layer 452. Therefore, in the optical modulation element 104, the stress applied to the intersection 370 of the substrate 230 is relaxed as compared with the optical waveguide element in the related art in which the buffer layer made of SiO2 is formed on the entire surface of the substrate 230 or the intersecting part.

Therefore, in the optical modulation element 104, as illustrated in the lower diagram of FIG. 5, the amount of change $\Delta n4$ in the effective refractive index of the input waveguide 232 at the intersection 370 is suppressed to be smaller than the value ($\Delta n9$ illustrated in 19) in the configuration in the related art using SiO2 as the buffer layer, and the degree of change in the propagation mode of the waveguide light in the input waveguide 232, that may occur at the intersection 370, can also be relaxed.

As a result, in the optical modulation element 104, the generation of leakage light due to the change in the propagation mode at the intersection 370 is suppressed to prevent or suppress the degradation or deterioration of the optical characteristics, and it is possible to effectively reduce an optical absorption loss due to the signal electrode 250b.

As described above, the configurations illustrated in FIGS. 3, 4, and 5 can be similarly applied to other intersecting parts where the optical waveguide 232 and the like and the electrode 250a and the like intersect, other than the part A. That is, in the optical modulation element 104, the same configurations as the configurations illustrated in FIGS. 3, 4, and 5 can be similarly applied to all or a part of the intersecting parts between the optical waveguide 232 and the like and the electrode 250a and the like, depending on the degree of suppression required for the optical absorption loss caused by the electrode metal and the degree of light leakage suppression required for suppressing the deterioration of the extinction ratio.

In the above configuration, the resin constituting the resin layer 452 can be, for example, a resin formed by a cross-linking reaction. Such a resin is composed of, for example, a polymer material containing a cross-linking agent, and can be formed by heat-processing the polymer material. Further, such a resin constituting the resin layer 452 can be formed as having a low Young's modulus of 1 to 2 GPa, which is one digit smaller than the Young's modulus of SiO2 of 72 GPa to 74 GPa.

Further, in the configurations illustrated in FIGS. 3, 4, and 5, the resin layer 452 is formed as a long rectangle (that is, Lz>Ly1) along the signal electrode 250b, having a length Lz and a width Ly1 in a plan view (see FIG. 3), but the present invention is not limited to this. The plan view of the resin layer 452 may be formed as a long rectangle (that is, Lz<Ly1) along the input waveguide 232 as long as it has a size that can cover the intersection 370.

Further, in the part A of FIG. 2 illustrated as an example of the intersecting parts, the crossing angle between the input waveguide 232 and the signal electrode 250b is assumed to be a right angle, but the present invention is not limited to this. The crossing angle can be any angle, and the plan view shape of the resin layer 452 can be any shape as long as it has a size that can cover the part where the input waveguide 232 and the signal electrode 250b intersect each other.

Further, in the configurations illustrated in FIGS. 3 to 5, the signal electrode 250b is composed of two metal layers 450-1 and 450-2, but the present invention is not limited to this. As described above, the signal electrode 250b may be formed of three or more metal layers. For example, the signal electrode at the intersection 370 may be composed of four metal layers 650-1, 650-2, 650-3, and 650-4, as the signal electrode 250b' illustrated in FIG. 6. In this case, at least two adjacent metal layers may be composed of different types of metals or the same type of metal formed in different ways.

In such a configuration, at the interface between the metal layers composed of the metal layers 650-1, 650-2, 650-3, and 650-4, propagation of the stress from the metal layer formed at the upper part to the metal layer formed at the lower part can be suppressed. Further, in such a configuration, the thickness per metal layer can be made thinner than that of an electrode composed of a smaller number of layers, so that the stress itself that can be generated inside each metal layer can be further reduced. As a result, in the configuration illustrated in FIG. 6, the stress applied from the signal electrode 250b' to the substrate 230 can be further relaxed.

When the electrode 250a or the like is composed of a multilayer structure including three or more metal layers at the intersection of the electrode 250a or the like and the optical waveguide 232 or the like, it is desirable that at least one (for example, 650-4) of the metal layers other than the lowest layer, which is the metal layer (for example, 650-1) closest to the substrate 230, is thicker than the lowest layer. Thus, the internal stress of the metal layer, which is formed thicker than the lowest layer, is effectively dispersed at the interface between the lowest layer which is formed thinner than the metal layer and the upper metal layer, and the stress applied to the optical waveguide 232 and the like on the substrate 230 and the change in refractive index caused by the stress are effectively relaxed.

Figure 8:
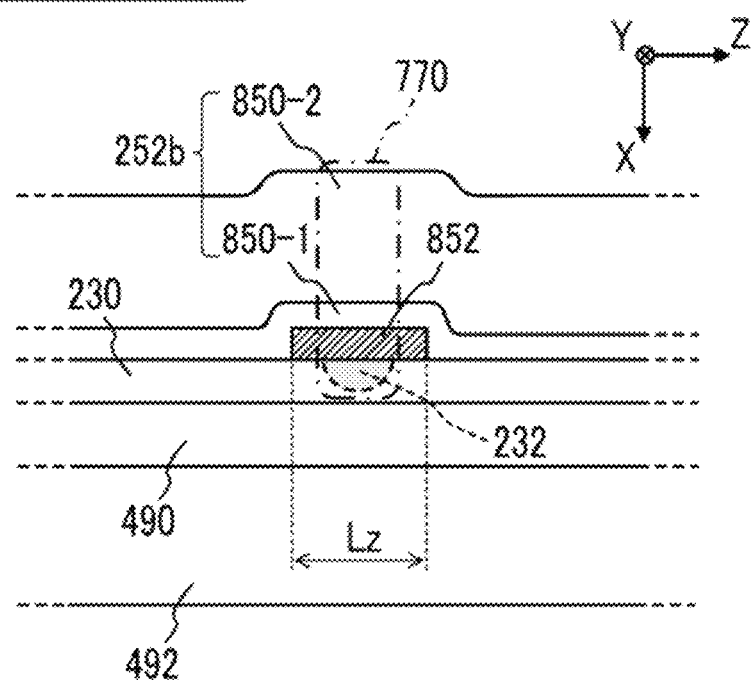
FIG. 8 is a cross-sectional view taken along line VIII-VIII of part B illustrated in FIG. 7.

Further, in the configuration illustrated in FIG. 8, the metal layers 650-1, 650-2, 650-3, and 650-4 are configured to have the same width, but the present invention is not limited to this. Some or all of the metal layers 650-1, 650-2, 650-3, and 650-4 may be formed in different widths from each other.

Next, a second configuration example of the intersecting part of the optical waveguide 232 and the like and the electrode 250a and the like, used in the optical modulation element 104 of the optical modulator 100 according to the present embodiment, will be described.

Figure 7:
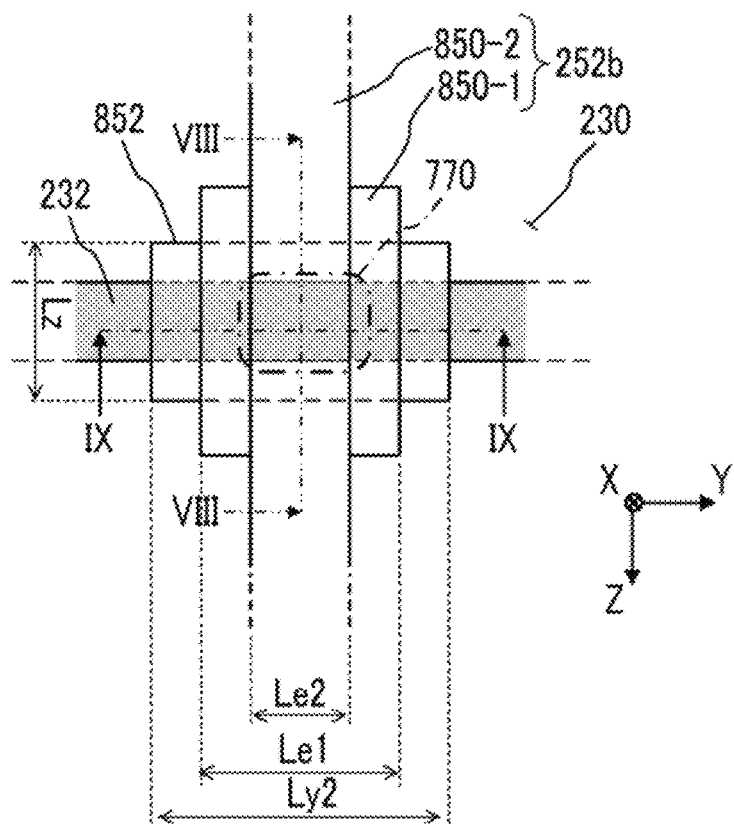
FIG. 7 is a partial detailed view of part B of the optical modulation element illustrated in FIG. 2.
Figure 9:
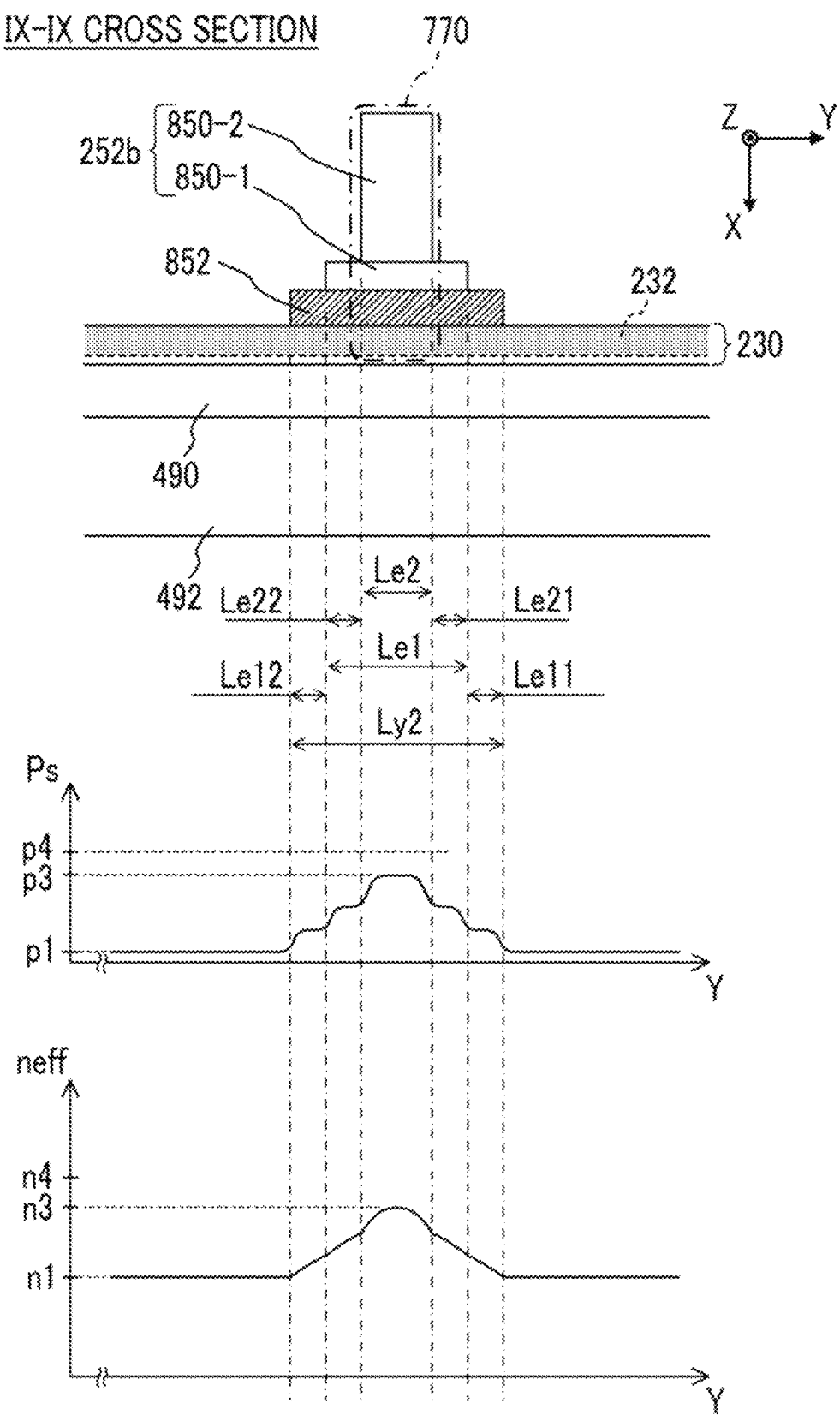
FIG. 9 is a cross-sectional view taken along line IX-IX of part B illustrated in FIG. 7 and a diagram for explaining an action in the cross section.

FIGS. 7, 8, and 9 are diagrams illustrating a second configuration example of the intersecting parts, and specifically, partial detailed views illustrating a part B where the input waveguide 232 and the signal electrode 252b intersect each other, illustrated in FIG. 2. Here, FIG. 7 is a plan view of part B illustrated in FIG. 2, and FIG. 8 is a cross-sectional view taken along line VIII-VIII of the part B illustrated in FIG. 7. The upper diagram of FIG. 9 is a cross-sectional view taken along line IX-IX of part B illustrated in FIG. 7, and the lower diagram of FIG. 9 is a diagram illustrating a change of the effective refractive index inside the input waveguide 232 along the waveguide direction of the input waveguide 232. That is, the upper diagrams of FIGS. 7, 8, and 9, and the lower diagram of FIG. 9 respectively correspond to the upper diagrams of FIGS. 3, 4, and 5, and the lower diagram of FIG. 5 illustrated for the part A of FIG. 2. Further, the middle diagram of FIG. 9 is a diagram illustrating a change in stress applied to the input waveguide 232 along the waveguide direction (Y direction in the present embodiment) of the input waveguide 232. In the middle diagram of FIG. 9, for comparison, the level of the peak value of the stress applied to the input waveguide 232 in the configuration of part A illustrated in FIGS. 3 to 5 is described as a value p4.

In FIGS. 7, 8, and 9, the same reference numerals as those in FIGS. 3, 4, and 5 are used for the same components as the components illustrated in FIGS. 3, 4, and 5, and the above description of FIGS. 3, 4, and 5 is adopted.

Further, the configurations of the part B illustrated in FIGS. 7, 8, and 9 are another examples of the configuration of the parts where the optical waveguide 232 and the like and the electrode 250a and the like intersect each other in the optical modulation element 104, can be used for the part A instead of the configurations illustrated in FIGS. 3, 4, and 5, and can be similarly used for any part where the optical waveguide 232 and the like and the electrode 250a and the like intersect each other, other than the part A and the part B.

In FIG. 7, the input waveguide 232 extending in the left-right direction (Y direction) and the signal electrode 252b extending in the up-down direction (Z direction) intersect with each other to form an intersection 770.

Similar to the intersection 370 of the part A illustrated in FIGS. 3 and 4, at the intersection 770 of the part B, the signal electrode 252b has a multi-stage configuration including a plurality of metal layers 850-1 and 850-2, and a resin layer 852 made of a resin material is formed between the signal electrode 252b and the substrate 230. However, different from the configuration of the part A illustrated in the upper diagram of FIG. 5, as illustrated in the upper diagram of FIG. 9, the part B is configured such that the lengths of the input waveguide 232 along the waveguide direction of the metal layers 850-1 and 850-2 and the resin layer 852 are different from each other.

Specifically, the resin layer 852 is formed such that the length Ly2 along the waveguide direction (or the extending direction (Y direction in this embodiment)) of the input waveguide 232 is longer than the length Le1 of the adjacent metal layer 850-1 along the waveguide direction of the input waveguide 232. Further, the metal layer 850-1 adjacent to the resin layer 852 is formed such that the length Le1 of the input waveguide 232 along the waveguide direction is longer than the length Le2 of another metal layer 850-2 adjacent to the metal layer 850-1 along the waveguide direction of the input waveguide 232. That is, Le2<Le1<Ly.

In the above configuration, since Le2<Le1<Ly, the stress transmitted to the substrate 230 from the metal layer 850-2, which is formed generally thicker than the lower metal layer 850-1 and can be a main stress generating factor, is dispersed by the lower metal layer 850-1 and the resin layer 852, which are formed longer than Le2, end reaches the substrate 230. Similarly, the stress from the metal layer 850-1 to the substrate 230 is dispersed by the resin layer 852 formed longer than Le1 and reaches the substrate 230. Therefore, the peak value of the stress applied to the substrate 230 at the intersection 770 decreases from the peak value p4 at the intersection 370 illustrated in FIG. 5 to become p3. Therefore, the change in the effective refractive index generated in the input waveguide 232 at the intersection 770 also becomes gradual, and the peak value of the effective refractive index decreases to n3 from the peak value n4 at the intersection 370 illustrated in FIG. 5.

Further, in the above configuration, since Le2<Le1<Ly, the change in the stress applied to the substrate 230 at the intersection 770 along the waveguide direction of the input waveguide 232 is stepwise as illustrated in the middle diagram of FIG. 9. Therefore, the change in the effective refractive index generated in the input waveguide 232 at the intersection 770 is also stepwise as illustrated in the lower diagram of FIG. 9, and the change in the effective refractive index in the extending direction of the input waveguide 232 becomes more gradual than when the peak value of the effective refractive index simply decreases.

Therefore, the change in the propagation mode of the waveguide light of the input waveguide 232 that can occur at the intersection 770 also becomes gradual, and the amount of leakage light that can occur due to the change in the propagation mode of the waveguide light of the input waveguide 232 at the part B including the intersection 770 can be reduced as compared to that in the part A illustrated in FIGS. 3 to 5. As a result, in the configuration of the part B illustrated in FIGS. 7 to 9, it is possible to further reduce the influence on the degradation or deterioration of the optical characteristics of the optical modulation element 104 due to the generation of leakage light, as compared with the configuration of the part A illustrated in FIGS. 3 to 5.

In the configuration of the part B described above, Le2<Le1<Ly is assumed, but the present invention is not limited to this. For example, as long as the length Ly2 of the resin layer 852 is formed to be longer than the length Le1 of the adjacent metal layer 850-1, the metal layer 850-1 adjacent to the resin layer 852 may be formed such that the length Le1 is equal to the length Le2 of another metal layer 850-2 adjacent to the metal layer 850-1 (that is, Le2=Le1<Ly2). Even in such a configuration, the stress from the metal layers 350-1 and 850-2 is dispersed by the resin layer 852 formed longer than the lengths of the metal layers 850-1 and 850-2 and transmitted to the substrate 230, so that the effective refractive index of the input waveguide 232 at the intersection 770 can be reduced to some extent to suppress the generation of leakage light.

In order to effectively change the effective refractive index of the optical waveguide 232 in response to the stepwise position change of the stress applied to the substrate 230 or the optical waveguide 232 as described above, it is desirable that the distance of the stepwise change of the stress is set to equal to or higher than the wavelength of light propagating through the optical waveguide 232. Therefore, preferably, the part of the resin layer 852 in which the metal layer 850-1 adjacent to the resin layer 852 is not formed is configured such that the lengths Le11 and/or Le12 along the waveguide direction of the optical waveguide 232 (see FIG. 9) are longer than the wavelength λ of the light, propagating through the optical waveguide 232 (that is, Le11, Le12≥λ). Further, preferably, a part where the other metal layer 850-2 adjacent to the metal layer 850-1 is not formed, of the metal layer 850-1 adjacent to the resin layer 852, is configured such that the length(c) Le21 and/or Le22 along the waveguide direction of the optical waveguide 232 are longer than the wavelength λ of the light propagating through the optical waveguide 232 (that is, Le21, Le22≥λ).

As described above in the description of the configuration of the part A, the electrodes 250a and the like at the intersection may be composed of a plurality of (two or more) metal layers. For example, In the configuration of the part B, the signal electrode 252b may have a third metal layer provided on the upper part of the metal layer 850-2. Further, the above effect can be similarly exerted even when the length of the third metal layer measured in the waveguide direction is longer than Le2.

Figure 10:
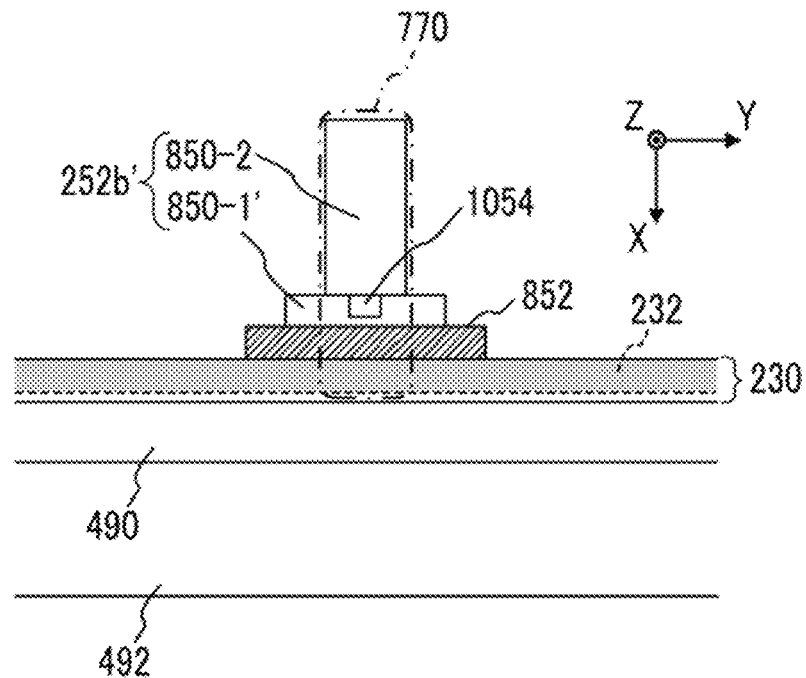
FIG. 10 is a diagram illustrating an example of an alternative configuration of part B.

Further, in the above-described configuration of the part B, a slit may be provided in the metal layer 850-1 in order to further reduce the stress transmitted from the signal electrode 252b to the substrate 230. FIG. 10 is a diagram illustrating an alternative configuration of the part B using such a metal layer 850-1' provided with the slit 1054, and is a diagram corresponding to the upper diagram of FIG. 9. In FIG. 10, the same reference numerals as those in the upper diagram of FIG. 9 are used for the same components as those in the upper diagram of FIG. 9.

In FIG. 10, the inside of the slit 1054 is, for example, a cavity. By providing the slit 1054 in the metal layer 850-1', the stress transmitted from the metal layer 850-2 above is released in the slit 1054, so that the stress transmitted from the metal layer 850-2 to the substrate 230 is further reduced as compared with the configuration illustrated in FIGS. 7 to 9. As a result, the change in the effective refractive index in the input waveguide 232 generated due to the stress becomes more gradual, the leakage light generated from the part B is further reduced, and the deterioration of the optical characteristics of the optical modulation element 104 due to the leakage light is further suppressed.

The length of the slit 1054 along the extending direction of the signal electrode 250b is preferably equal to or greater than the width of the input waveguide 232 from the viewpoint of stress release. Further, in the configuration illustrated in FIG. 10, the slit 1054 formed in the metal layer 850-1' is provided halfway in the thickness direction of the metal layer 850-1', but the present invention is not limited to this. The slit 1054 may be provided so as to penetrate the metal layer 850-1' until it reaches the surface of the resin layer 852.

Further, in the configuration illustrated in FIG. 10, the slit 1054 is formed in the metal layer 850-1' sandwiched between the two layers of the rosin layer 852 and the metal layer 880-2, but the present invention is not limited to this. For example, when the signal electrode 252b' is composed of three or more metal layers, a slit such as the slit 1054 can be provided in a metal layer sandwiched between any two layers (any two layers, including the above three or more metal layers and the resin layer on the substrate 230). That is, the slit can be formed in at least one metal layer other than the metal layer formed at the uppermost part, among the metal layers constituting the multilayer structure of the signal electrode 252b'.

Figure 11:
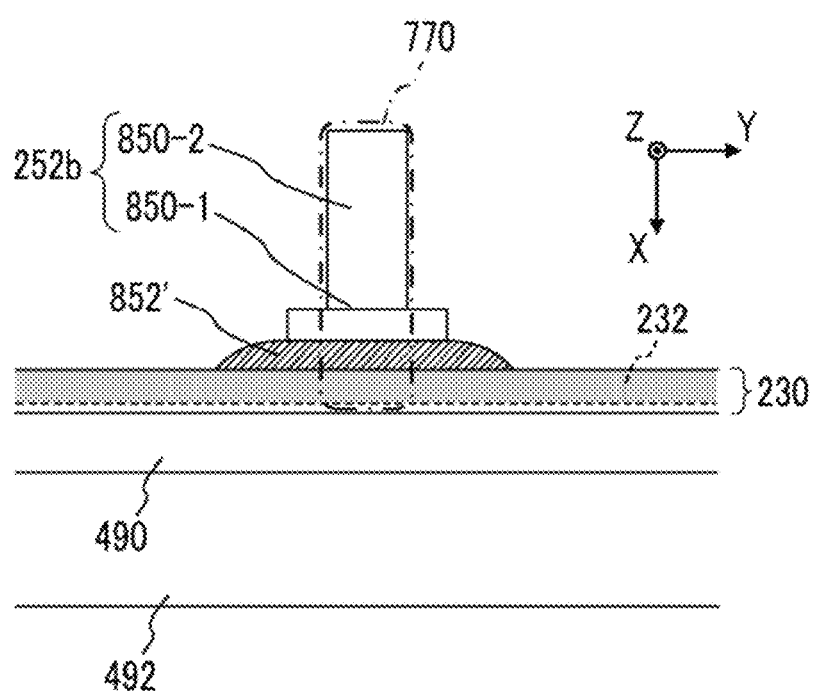
FIG. 11 is a diagram illustrating another example of an alternative configuration of part B.

Further, in the configuration of the part B illustrated in the upper diagram of FIG. 9, as a configuration for making a change in the effective refractive index of the input waveguide 232 more gradual, the thickness of the left and right ends of the resin layer 852 may be configured thinner as the distance from the intersection 770 increases. FIG. 11 is a diagram illustrating another alternative configuration of part B, using such a resin layer 852' formed thinner at respective ends along the waveguide direction of the input waveguide 232 as the distance from the intersection 770 increases, and is a diagram corresponding to the upper diagram of FIG. 9. In FIG. 11, the same reference numerals as those in the upper diagram of FIG. 9 are used for the same components as those in the upper diagram of FIG. 9.

In the configuration illustrated in FIG. 11, since the thickness of respective ends of the resin layer 852' becomes thinner as the distance from the intersection 770 increases, the stress applied to the substrate 230 via these respective ends decreases as the distance from the intersection 770 increases. Therefore, the change in the effective refractive index of the input waveguide 232 at respective ends is more gradual than the change in the effective refractive index at respective ends of the resin layer 852 in the configuration illustrated in FIG. 9.

Therefore, in the configuration illustrated in FIG. 11, the change in the propagation mode of the input waveguide 232 in the part B becomes more gradual than in the configuration illustrated in the upper diagram of FIG. 9, and the generation of leakage light in the part B is further suppressed. As a result, in the configuration illustrated in FIG. 11, the deterioration of the optical characteristics of the optical modulation element 104 due to the leakage light that may occur in the part B can be further suppressed as compared with the configuration illustrated in the upper diagram of FIG. 9. The shape like the resin layer 852' illustrated in FIG. 11 can be easily formed by increasing the viscosity before curing of the resin constituting the resist layer 852', by making the heat treatment time longer than usual and/or the heating temperature higher than usual in the process of forming the resin layer 852'.

Further, the shape like the resin layer 852' illustrated in FIG. 11 can be easily formed by incorporating a cross-linking agent into the resin and causing a cross-linking reaction. In FIG. 11, the thickness of the resin layer 852' begins to decrease from the intersection 770, but the present invention is not limited to this. For example, the thickness of the resin layer 852' may be substantially the same to a certain range from the intersection 770, and then gradually become thinner.

Next, a third configuration example of the intersecting part of the optical waveguide 232 and the like and the electrode 250a and the like, used in the optical modulation element 104 of the optical modulator 100 according to the present embodiment, will be described.

Figure 12:
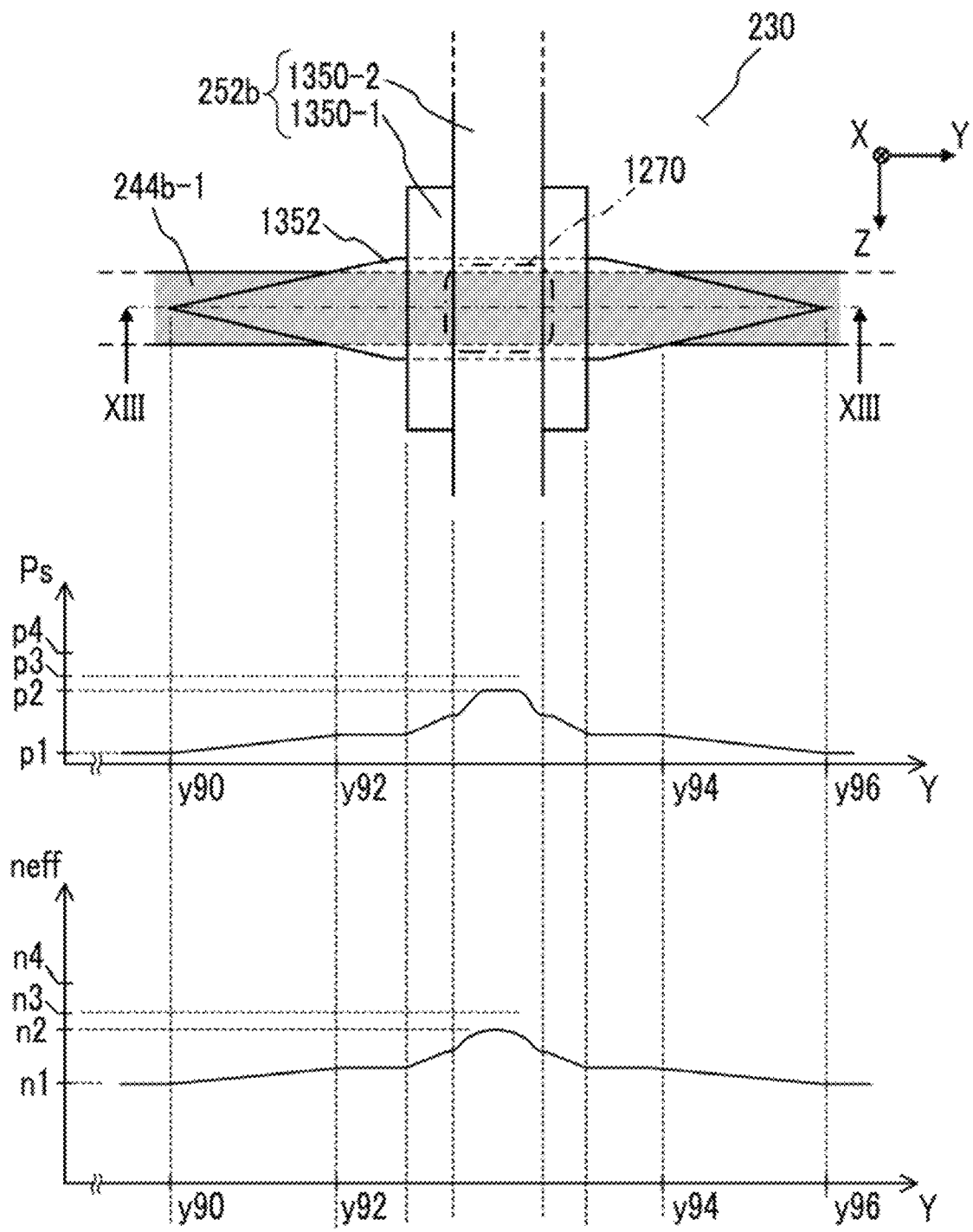
FIG. 12 is a partial detailed view of part C of the optical modulation element illustrated in FIG. 2.
Figure 13:
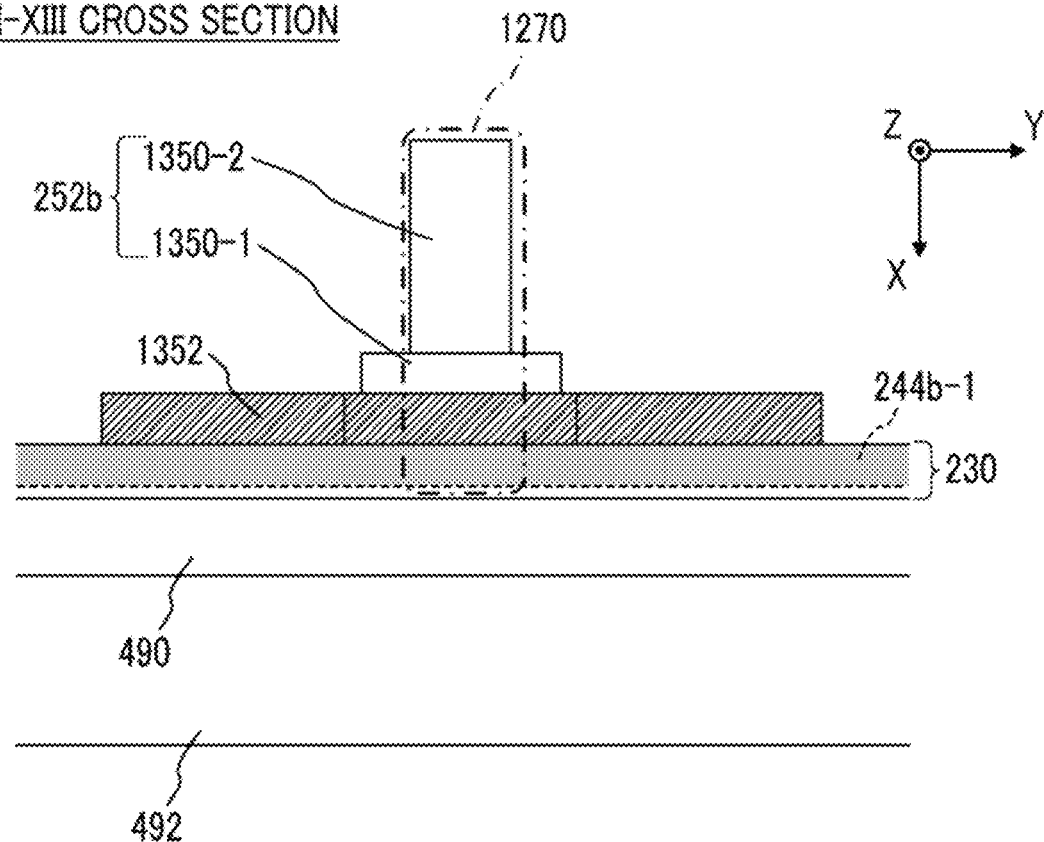
FIG. 13 is a cross-sectional view taken along line XIII-XIII of part C illustrated in FIG. 12.

FIGS. 12 and 13 are diagrams illustrating a third configuration example of the intersecting part, and specifically, partial detailed views illustrating a part C where one optical waveguide 244b-1 constituting the parallel waveguide of the Mach-Zehnder type optical waveguide 244b and the signal electrode 252b intersect each other. Illustrated in FIG. 2. Here, the upper diagram of FIG. 12 is a plan view of part C, the middle diagram of FIG. 12 is a diagram Illustrating a change in stress applied to the optical waveguide 244b-1 along the waveguide direction (Y direction in the present embodiment) of the optical waveguide 244b-1, and the lower diagram of FIG. 12 is a diagram illustrating a change in the effective refractive index inside the optical waveguide 244b-1 along the waveguide direction of the optical waveguide 244b-1. Further, FIG. 13 is a plan view of XIII-XIII in the diagram at the top of FIG. 12.

The upper diagram of FIG. 12 corresponds to FIGS. 3 and 7 illustrating the parts A and B, respectively. Further, the middle diagram of FIG. 12 corresponds to the middle diagram of FIG. 9 illustrating the part 3, and the lower diagram of FIG. 12 corresponds to the lower diagram of FIG. 9. Further, FIG. 13 corresponds to the diagrams at the tops of FIGS. 5 and 9 illustrating the parts A and B, respectively.

In FIGS. 12 and 13, the same reference numerals as those in FIGS. 3 to 11 are used for the same components and values as the components and values illustrated in FIGS. 3 to 11, and the above description of FIGS. 3 to 11 is adopted.

The configuration of the part C illustrated in FIGS. 12 and 13 is an example of the configuration of the part where the optical waveguide 232 and the like and the electrode 250a and the like intersect each other, can be used for the part A instead of the configuration illustrated in FIGS. 3 to 5, and can be used for the part B instead of the configuration illustrated in FIGS. 7 to 9. Further, the configuration of the part C illustrated in FIGS. 12 and 13 can be similarly applied to any other intersecting part between the optical waveguide 232 and the like and the electrode 250a and the like other than the part A and the part B.

In the upper diagram of FIG. 12, the optical waveguide 244b-1 extending in the left-right direction (Y direction) and the signal electrode 252b extending in the up-down direction (Z direction) intersect with each other to form an intersection 1270. In FIG. 13, the configuration of the signal electrode 252b at the intersection 1270 of the part C has a multi-stage configuration including the plurality of metal layers 1350-1 and 1350-2, similar to the configuration of the signal electrode 252b at the intersection 770 of the part B illustrated in the upper diagram of FIG. 9. However, as illustrated in the upper diagram of FIG. 12, at the intersection 1270, a resin layer 1352 having a shape different from that of the resin layer 852 illustrated in the upper diagram of FIG. 9 is formed between the lower metal layer 1350-1 and the substrate 230. The metal layers 1350-1 and 1350-2 are electrically connected to the metal layers 850-1 and 850-2 illustrated in the upper diagram of FIG. 9, respectively, as part of the signal electrode 252b.

The resin layer 1352 has a uniform thickness like the resin layer 852 illustrated in the upper diagram of FIG. 9, but its plan view is different from that of the resin layer 852 formed of a rectangle (see the upper diagram of FIGS. 7 and 12). That is, as illustrated in the upper diagram of FIG. 12, in the resin layer 1352, at respective ends of the optical waveguide 244b-1 along the waveguide direction (that is, the left-right direction), the width in the direction orthogonal to the waveguide direction is equal to or less than the width of the optical waveguide 244b-1 and becomes narrower as the distance from the intersection 1270 increases. Specifically, the resin layer 1352 has, for example, a polygon having apexes at respective ends in the waveguide direction (the left and right ends in the upper diagram of FIG. 12) in a plan view.

In the middle and lower diagrams of FIG. 12, the region in which the width of the resin layer 1352 is narrower than the width of the optical waveguide 244b-1 as the distance from the intersection 1270 is increased is illustrated as the region from the positions y90 to y92 in the Y-axis direction and the region from positions y94 to y96.

In these regions, the range in which the resin layer 1352 covers the optical waveguide 244b-1 in the width direction of the optical waveguide 244b-1 changes along the waveguide direction (Y-axis direction). Therefore, the stress applied from the signal electrode 252b to the optical waveguide 244b-1 part of the substrate 230 via the resin layer 1352 also changes along the waveguide direction (Y-axis direction).

Specifically, as illustrated in the middle diagram of FIG. 12, the stress applied to the part of the optical waveguide 244b-1 gradually increases from y96 to y94, and gradually decreases from y92 to y90, along the propagation direction of the waveguide light (direction from right to left). Therefore, the effective refractive index of the optical, waveguide 244b-1 also gradually increases from y96 to y94 and gradually decreases from y92 to y90 as illustrated in the lower part of FIG. 12 due to the photoelastic effect. As a result, the change in the effective refractive index of the optical waveguide 244b-1 in the range from the position y96 to the position y90 is more gradual than the change in the effective refractive index of the input waveguide 232 in the part A illustrated in FIGS. 3 to 5 and the part B illustrated in FIGS. 6 to 8, and the change in the propagation mode of the waveguide light is also more gradual.

Further, since the range in which the resin layer 1352 covers the optical waveguide 244b-1 is wider than the range in which the resin layer 852 covers the input waveguide 232 in the part B illustrated in FIGS. 7 to 9, the peak value p2 of the stress applied to the optical waveguide 244b-1 is smaller than the peak value p3 of the stress of the input waveguide 232 in the part B (see the middle diagram of FIG. 12), and the peak value n2 of the effective refractive index of the optical waveguide 244b-1 is also smaller than the peak value n3 of the effective refractive index of the input waveguide 232 in the part B (see the lower diagram of FIG. 12).

Therefore, the change in the propagation mode in the part C of the optical waveguide 24b-1 becomes more gradual than the change in the propagation mode in the part B of the input waveguide 232. As a result, the degree of occurrence of leakage light in the part C due to the change in the propagation mode is further suppressed as compared with the parts A and B, and effects on optical characteristics, or the like of the optical modulation element 104 through the generation of the leakage light can be further reduced.

In the upper diagram of FIG. 12, as an example, the resin layer 1352 having a polygon having apexes at respective ends (left and right ends) in the waveguide direction in a plan view is illustrated, but the present invention is not limited to this. As long as in the resin layers 1352, at respective ends of the optical waveguide 244b-1 along the waveguide direction, the width in the direction orthogonal to the waveguide direction is equal to or less than the width of the optical waveguide 244b-1 and becomes narrower as the distance from the intersection 1270 increases, it can be composed of other shapes. Such a shape may be, for example, a shape in which the left and right; ends are curved. It should be noted that not only the end of the resin layer 1352 but also the other corner parts of the resin layer 1352 can be configured by a curve.

Figure 14:
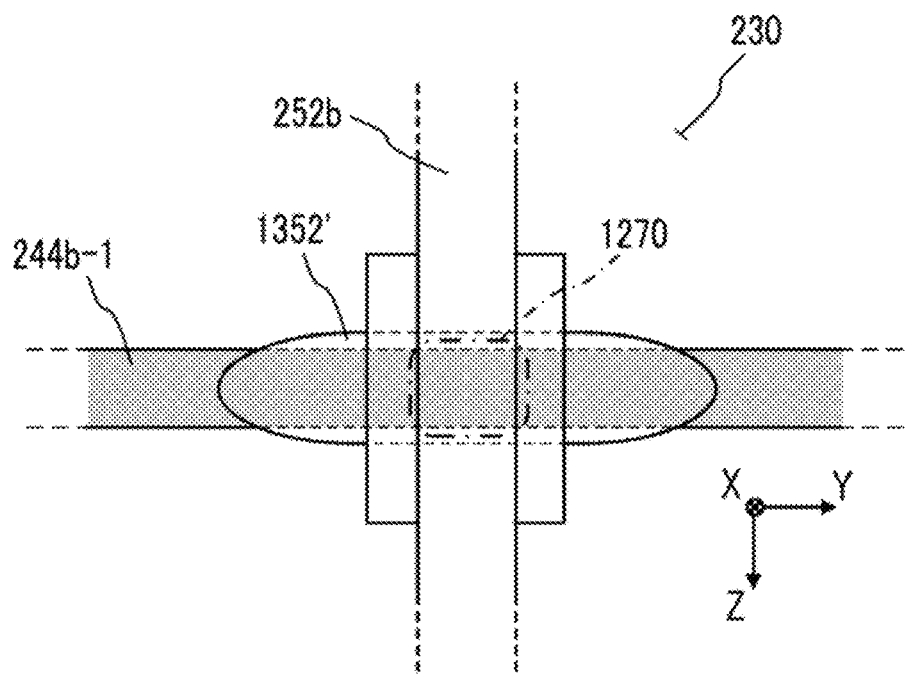
FIG. 14 is a cross-sectional view taken along line XIV-XIV of part C illustrated in FIG. 12 and a diagram for explaining an action in the cross section.

FIG. 14 is a diagram illustrating an alternative configuration of the part C using such a resin layer 1352' having curved ends in a plan view, and is a diagram corresponding to the upper diagram of FIG. 12. In FIG. 14, the same reference numerals as those in FIGS. 12 and 13 are used for the same components as those in FIGS. 12 and 13. Even in the configuration illustrated in FIG. 14, since at respective ends of the resin layer 1352' on the left and right sides, the width of the optical waveguide 244b-1 in the direction orthogonal to the waveguide direction is narrower as the distance from the intersection 1270 increases, the change in the propagation mode of the optical waveguide 244b-1 is made more gradual, and the generation of leakage light can be effectively suppressed.

Second Embodiment

Figure 15:
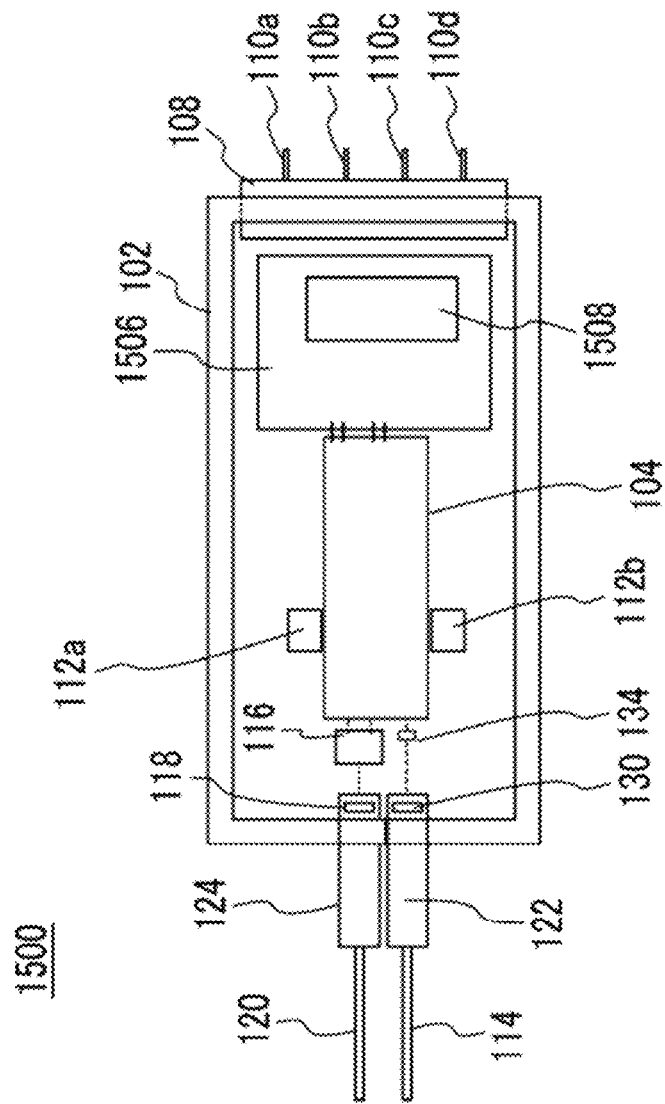
FIG. 15 is a diagram illustrating a configuration of an optical modulation module according to a second embodiment of the present invention.

Next, a second embodiment of the present invention will be described. The present embodiment is an optical modulation module 1500 using the optical modulation element 104 included in the optical modulator 100 according to the first embodiment. FIG. 15 is a diagram illustrating the configuration of the optical modulation module 1500 according to the present embodiment. In FIG. 15, the same components as those of the optical modulator 100 according to the first embodiment illustrated in FIG. 1 are shown using the same reference numerals as the reference numerals shown in FIG. 1, and the description of FIG. 1 is adopted.

The optical modulation module 1500 has the same configuration as that of the optical modulator 100 illustrated in FIG. 1, but differs from the optical modulator 100 in that a circuit substrate 1506 is provided instead of the relay substrate 106. The circuit substrate 1506 includes a drive circuit 1508. The drive circuit 1508 generates a high-frequency electrical signal for driving the optical modulation element 104, based on a modulation signal supplied from the outside via signal pins 110a, 110b, 110c, and 110d, and outputs the generated high-frequency electrical signal to the optical modulation element 104.

The optical modulation module 1500 having the above configuration includes the optical modulation element 104 having the configuration illustrated in FIGS. 3 to 14 at the intersecting parts of the optical waveguide 232 and the like and the electrode 250a and the like, similarly to the optical modulator 100 according to the first embodiment described above. Thus, similar to the optical modulator 100, in the optical modulation module 1500, without causing degradation or deterioration of the optical characteristics of the optical modulation element 104, it is possible to effectively reduce an optical absorption loss of waveguide light which may occur at the intersecting part of the optical waveguide 232 or the like and the electrode 250a or the like on the substrate 230, achieve good modulation characteristics, and perform a good optical transmission.

Third Embodiment

Figure 16:
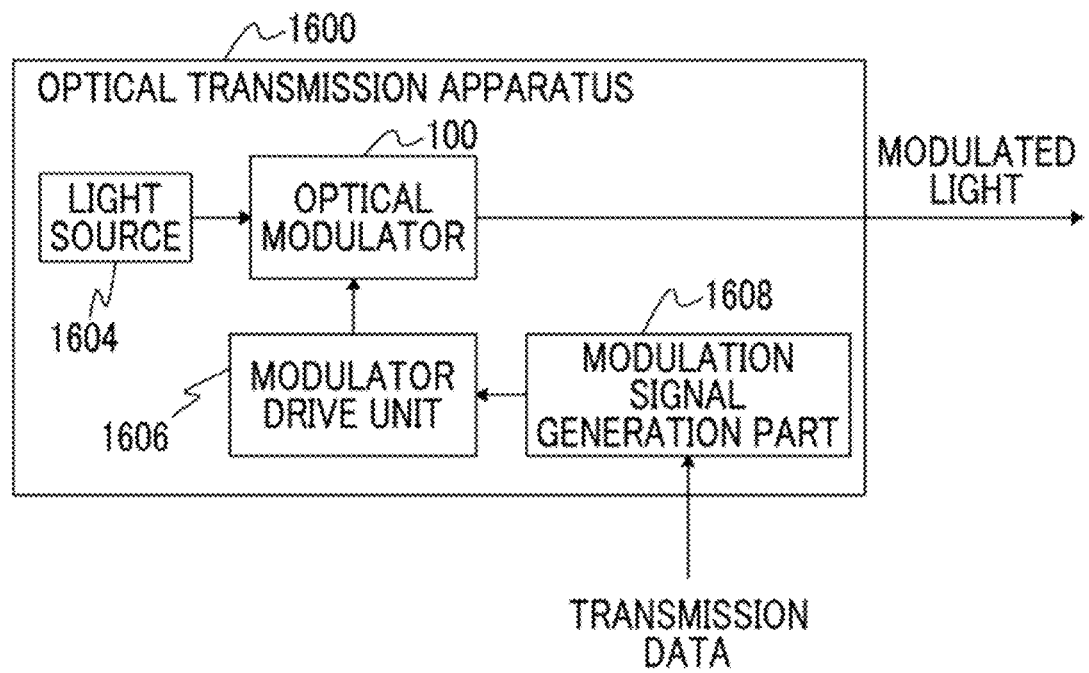
FIG. 16 is a diagram illustrating a configuration of an optical transmission apparatus according to a third embodiment of the present, invention.

Next, a third embodiment of the present invention will be described. The present embodiment is an optical transmission apparatus 1600 equipped with the optical modulator 100 according to the first embodiment. FIG. 16 is a diagram illustrating a configuration of an optical transmission apparatus 1600 according to the present embodiment. The optical transmission apparatus 1600 includes an optical modulator 100, a light source 1604 that inputs light to the optical modulator 100, a modulator drive unit 1606, and a modulation signal generation part 1600. The above-described optical modulation module 1500 can be used instead of the optical modulator 100 and the modulator drive unit 1606.

The modulation signal generation part 1606 is an electronic circuit that generates an electrical signal for causing the optical modulator 100 to perform a modulation operation, generates a modulation signal which is a high-frequency signal for causing the optical modulator 100 to perform an optical modulation operation according to the modulation data, based on transmission data given from the outside, and outputs the generated modulation signal to the modulator drive unit 1606.

The modulator drive unit 1606 amplifies the modulation signal input from the modulation signal generation part 1603 and outputs four high-frequency electrical signals for driving four signal electrodes 250a, 252a, 250b, and 252b of the optical modulation element 104 included in the optical modulator 100.

The four high-frequency electrical signals are input to the signal pins 110a, 110b, 110c, and 110d of the optical modulator 100 to drive the optical modulation element 104.

Thus, the light output from the light source 1604 is, for example, DP-QPSK modulated by the optical modulator 100 to become modulated light, and is output from the optical transmission apparatus 1600.

In particular, since the optical transmission apparatus 1600 uses an optical modulator 100 provided with an optical modulation element 104 capable of effectively reducing the optical absorption loss at the Intersecting parts of the optical waveguide 232 and the like and the electrode 250a and the like, good modulation characteristics are achieved and good optical transmission can be performed.

The present invention is not limited to the configurations of the above-described embodiment and its alternative configuration, and can be implemented in various embodiments without departing from the gist thereof.

For example, in the first embodiment described above, in the optical modulation element 104, the part A which is the intersecting part of the input waveguide 232 and the signal electrode 250b, the part B which is the intersecting part of the input waveguide 232 and the signal electrode 252b, and the part C which is the intersecting part of the optical waveguide 244b-1 and the signal electrode 252b have the configurations illustrated in FIGS. 3 to 6, FIGS. 7 to 11, and FIGS. 12 to 14, respectively, but the present invention is not limited to this.

The optical modulation element 104, which is an optical waveguide element, can have any one configurations illustrated in FIGS. 3 to 6, FIGS. 7 to 11, and FIGS. 12 to 14, with respect to a part or all intersecting parts of the optical waveguide 232 and the like and the electrode 250a and the like. Therefore, for example, any of the configurations illustrated in FIGS. 3 to 6 illustrated for the part A which is the intersecting part of the signal electrode 250b and the input waveguide 232 may be applied to the intersecting part of the bias electrode 264b and the input waveguide 232.

Figure 6:
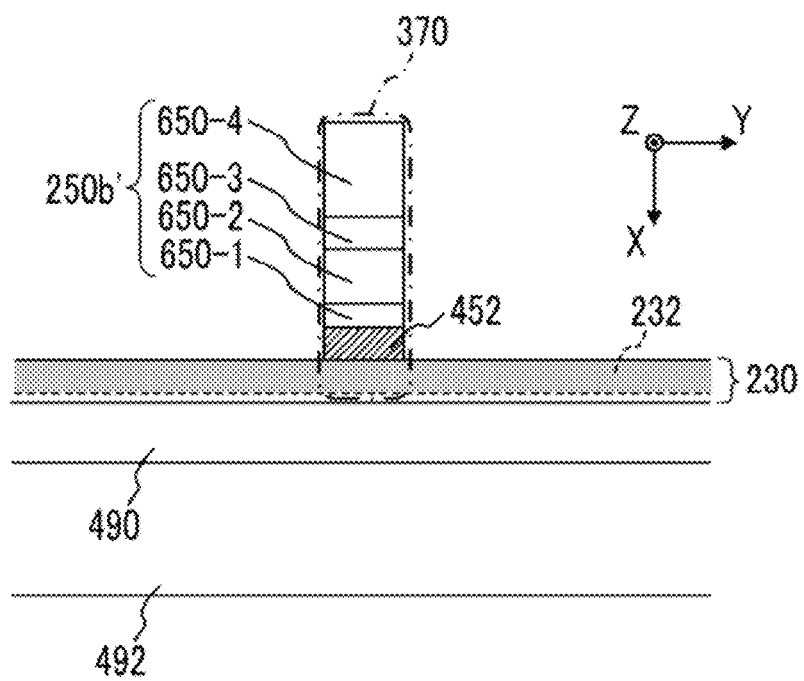
FIG. 6 is a diagram illustrating an example of another configuration of a signal electrode of part A.

Further, as will be easily understood by those skilled in the art, the multilayer structure of the signal electrode 250b' illustrated in FIG. 6 illustrated as an alternative configuration of the part A can be combined with the configuration of the part B or the part C illustrated in FIGS. 7 to 14. Further, with respect to the slit 1054 in FIG. 10 and the resin layer 852' of which the thickness changes in FIG. 11 illustrated as an alternative configuration of the part B, the configuration of the part A illustrated in FIGS. 3 to 6 or the configuration of the part C illustrated in FIGS. 12 to 14 can be combined. By performing these combinations, the change in the effective refractive index of the optical waveguide 232 or the like intersecting with the electrode 250a or the like is further relaxed, the deterioration of the optical characteristics of the optical modulation element 104 due to the occurrence of leakage light from the intersection is avoided, and the optical absorption loss in the optical waveguide 232 and the like caused by the intersecting electrodes 250a and the like can be reduced.

Further, in the above-described first embodiment, the res in layers 452, 852, and 1352 in the parts A, B, and C which are the intersections of the optical waveguide 232 and the like and the electrode 250a and the like are assumed to be formed individually for each intersection, but the present invention is not limited to this. These resin layers may be formed across (or connecting) at least two Intersections (for example, at least two adjacent intersections). For example, in the parts A and B which are two adjacent intersections, the resin layer 452 of the part A and the resin layer 852 of the part B can be assumed to be continuously formed as one resin layer. In this case, in the continuously formed resin layer, parts other than the parts corresponding to the resin layer 452 and the resin layer 352 may be formed with a thickness different from the thickness of the resin layer 452 and the resin layer 852 (for example, thinner). Alternatively, when the resin layer 452 and the resin layer 852 have the same thickness, the continuously formed resin layer may be formed to have the same uniform thickness as the thickness of the resin layer 452 and the resin layer 352.

As a result, the change in the effective refractive index due to stress between the proximity waveguides or between the same interference system waveguides can be equivalent, and the contact area between the resin layer 452 and the like and the substrate 230 is widened so that the adhesion of the resin layer 452 and the like to the substrate 230 can be improved.

Further, in the above-described embodiment, as an example of the optical waveguide element, the optical modulation element 104 formed of the substrate 230 which is LiNbO3 (LN) is illustrated, but the optical waveguide element may be formed by using a substrate of InP, Si, or the like.

As described above, the optical modulator 100 according to the first embodiment described above includes an optical modulation element 104. The optical modulation element 104, which is an optical waveguide element, includes a substrate 230, an optical waveguide 232 or the like formed on the substrate 230, and an electrode 250a or the like for controlling a light wave propagating through the optical waveguide 232 or the like. Further, the optical waveguide 232 or the like and the electrode 250a or the like have an intersection 370 or the like in which the optical waveguide 232 or the like and the electrode 250a or the like intersect with each other, and at the intersection 370 or the like, the electrode 250a or the like has a multilayer structure including a plurality of metal layers made of a metal material, and a resin layer 452 or the like made of a resin material is formed between the electrode 250a or the like and the substrate 230.

According to this configuration, it is possible to effectively reduce an optical absorption loss of waveguide light due to an electrode metal, which may occur at the intersection 370 or the like between the optical waveguide 232 or the like on the substrate 230 and the electrode 250a or the like, without causing degradation or deterioration of the optical characteristics of the optical modulation element 104.

Further, in the optical modulation element 104, in the multilayer structure of the electrode, at least one of the metal layers excluding the lowest, layer, which is the metal layer closest to the substrate, can be made thicker than the lowest layer. According to this configuration, the internal stress of the metal layer formed thicker than the lowest layer is effectively dispersed at the interface between the lowest layer and the upper metal layer, which are formed thinner than the metal layer, and the stress applied to the optical waveguide 232 and the like on the substrate 230 and the change in refractive index caused by the stress are effectively relaxed.

Further, in the optical nodulation element 104, the resin layer 852 can be used. The resin layer 852 is formed such that the length Ly2 along the waveguide direction of the input waveguide 232 is longer than the length Le1 of the metal layer 850-1 adjacent to the resin layer 852 along the waveguide direction. Here, the resin layer 852 is preferably configured such that the length Le11 and/or Le12 along the waveguide direction of the input waveguide 232, of the part where the adjacent, metal layer 850-1 is not formed, is longer than the wavelength λ of the light propagating through the input waveguide.

Further, in the optical nodulation element 104, the metal layer 850-1 adjacent to the resin layer 652 can be formed such that a length Le1 along the waveguide direction of the input waveguide 232 is equal to or longer than a length Le2 along the waveguide direction of the metal layer 650-2 which is another metal layer adjacent to the metal layer 850-1. Here, the metal layer 850-1 adjacent to the resin layer 852 is configured such that the length Le21 and/or Le22 along the waveguide direction of the input waveguide 232, of the part where the metal layer 850-2, which is the other metal layer, is not formed, is longer than the wavelength of the light propagating through the input waveguide 232.

Further, in the optical modulation element 104, the resin layer 1352 or the resin layer 1352' can be used. In the rosin layers 1352 and 1352', at respective ends of the optical waveguide 244b-1 along the waveguide direction, the width in the direction orthogonal to the waveguide direction is equal to or less than the width of the optical waveguide 244b-1 and becomes narrower as the distance from the intersection 1270 increases.

Further, in the optical modulation element 104, the resin layer 852' can be used. The resin layer 852' is formed thinner at respective ends of the input waveguide 232 along the waveguide direction as the distance from the intersection 770 increases.

Further, in the optical modulation element 104, such as the slit 1054 at the intersection 770, a slit can be formed in at least one metal layer excluding the metal layer formed at the uppermost part, among the metal layers constituting the multilayer structure such as the electrode 250a at the intersection.

According to these configurations, the change in the effective refractive index of the input waveguide 232 in the part B including the intersection 770 is made more gradual, and the optical characteristics of the optical modulation element 104 can be further maintained better.

Further, in the optical nodulation element 104, the resin layer 452 and the like can be formed across at least two intersections among the intersections of the electrodes 250a and the like and the optical waveguide 232 and the like. According to this configuration, the change in the effective refractive index due to stress between the proximity waveguides or between the same interference system waveguides can be equivalent, and the contact area between the resin layer 452 and the like and the substrate 230 is widened so that the adhesion of the resin layer 452 and the like to the substrate 230 can be improved.

Further, the optical modulation module 1500 according to the second embodiment includes an optical modulation element 104 that modulates light, which is an optical waveguide element, and a drive circuit 1508 that drives the optical modulation element 104.

Further, the optical transmission apparatus 1600 according to the third embodiment includes an optical modulator 100 or an optical modulation module 1500, and a modulation signal generation part 1608 which is an electronic circuit for generating an electrical signal for causing the optical modulation element 104 to perform a modulation operation.

According to these configurations, an optical modulation module 1500 or an optical transmission apparatus 1600 having good characteristics can be achieved.

What is claimed is:

1. An optical waveguide element comprising:
a substrate;
an optical waveguide formed in the substrate; and an electrode for controlling a light wave propagating through the optical waveguide, wherein the optical waveguide and the electrode have an intersection in which the optical waveguide and the electrode intersect with each other, at the intersection, the electrode has a multilayer structure including a plurality of metal layers made of a metal material, and a resin layer made of a resin material is formed between the electrode and the substrate, an adjacent metal layer, which is one of the plurality of metal layers that is adjacent to the resin layer, is formed such that a length of the adjacent metal layer along a waveguide direction of the optical waveguide is equal to or longer than a length of another metal layer, of the plurality of metal layers, adjacent to the adjacent metal layer along the waveguide direction of the optical waveguide, and the adjacent metal layer is formed such that a length of a part of the adjacent metal layer where the other metal layer is not formed along the waveguide direction of the optical waveguide is longer than a wavelength of light propagating through the optical waveguide.

2. The optical waveguide element according to claim 1, wherein in the multilayer structure of the electrode, at least one of the metal layers excluding the adjacent metal layer, which is the metal layer closest to the substrate, is thicker than the adjacent metal layer.

3. The optical waveguide element according to claim 1, wherein the resin layer is formed such that a length of the resin layer along the waveguide direction of the optical waveguide is longer than the length of the adjacent metal layer the waveguide direction of the optical waveguide.

4. The optical waveguide element according to claim 3, wherein the resin layer is formed such that a length of a part of the resin layer where the adjacent metal layer is not formed, along the waveguide direction of the optical waveguide is longer than the wavelength of light propagating through the optical waveguide.

5. The optical waveguide element according to claim 1, wherein the resin layer is formed such that at respective ends along the waveguide direction of the optical waveguide, a width in a direction orthogonal to the waveguide direction is equal to or less than a width of the optical waveguide and is narrower as a distance from the intersection increases.

6. The optical waveguide element according to claim 1, wherein the resin layer is formed such that a thickness is thinner at respective ends along the waveguide direction of the optical waveguide as a distance from the intersection increases.

7. The optical waveguide element according to claim 1, wherein a slit is formed in at least one metal layer excluding a metal layer formed at an uppermost part, among the metal layers constituting the multilayer structure.

8. The optical waveguide element according to claim 1, wherein the resin layer is formed across at least two intersections.

9. An optical modulator comprising:

the optical waveguide element according to claim 1, which is an optical modulation element that modulates light;

a housing that houses the optical waveguide element;

an optical fiber that inputs light to the optical waveguide element; and an optical fiber that guides light which is output by the optical waveguide element to the an outside of the housing.

10. An optical transmission apparatus comprising:

the optical modulator according to claim 9; and an electronic circuit that generates an electrical signal for causing the optical waveguide element to perform a modulation operation.

11. An optical modulation module comprising:

the optical waveguide element according to claim 1, which is an optical modulation element that modulates light; and a drive circuit that drives the optical waveguide element.

12. An optical transmission apparatus comprising:

the optical modulation module according to claim 11; and an electronic circuit that generates an electrical signal for causing the optical waveguide element to perform the modulation operation.

* * * * *